(12) United States Patent
Kobori et al.

(10) Patent No.: US 8,006,807 B2
(45) Date of Patent: Aug. 30, 2011

(54) ELEVATOR GROUP CONTROL APPARATUS

(75) Inventors: Shingo Kobori, Tokyo (JP); Masafumi Iwata, Tokyo (JP); Naohiko Suzuki, Tokyo (JP); Shiro Hikita, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 521 days.

(21) Appl. No.: 12/300,227

(22) PCT Filed: Jan. 19, 2007

(86) PCT No.: PCT/JP2007/050822
§ 371 (c)(1),
(2), (4) Date: Nov. 10, 2008

(87) PCT Pub. No.: WO2008/001508
PCT Pub. Date: Jan. 3, 2008

(65) Prior Publication Data
US 2010/0230213 A1  Sep. 16, 2010

(30) Foreign Application Priority Data

Jun. 27, 2006 (JP) ................................. 2006-176916

(51) Int. Cl.
*B66B 1/18* (2006.01)
(52) U.S. Cl. ........................................ 187/382; 187/247
(58) Field of Classification Search .................. 187/247, 187/248, 380–389, 391–393; 706/903, 910
See application file for complete search history.

(56) References Cited

U.S. PATENT DOCUMENTS

| | | | | |
|---|---|---|---|---|
| 3,746,131 A * | 7/1973 | Hirasawa et al. | ............. | 187/380 |
| 4,046,228 A * | 9/1977 | Powell | ........... | 187/387 |
| 4,448,286 A | 5/1984 | Kuzunuki et al. | | |
| 5,058,711 A * | 10/1991 | Tsuji | ............... | 187/383 |
| 5,563,386 A * | 10/1996 | Powell et al. | ................. | 187/382 |
| 6,394,232 B1* | 5/2002 | Iwata et al. | .................. | 187/382 |
| 7,114,595 B2* | 10/2006 | Urata | ............. | 187/382 |
| 7,389,857 B2* | 6/2008 | Hikita | ............. | 187/249 |
| 7,568,556 B2* | 8/2009 | Hikita | ............. | 187/382 |

FOREIGN PATENT DOCUMENTS

CN  1767994 A  5/2006

(Continued)

OTHER PUBLICATIONS

Office Action issued Aug. 6, 2010 in German Application No. 11 2007 001 577.2 (With English Translation).

*Primary Examiner* — Anthony Salata
(74) *Attorney, Agent, or Firm* — Oblon, Spivak, McClelland, Maier & Neustadt, L.L.P.

(57) ABSTRACT

An elevator group control apparatus includes a parameter calculating unit for determining a weighting factor for an item to be evaluated, which is calculated from a running distance estimated by an estimation arithmetic operation unit by taking into consideration a relation between a running distance of an elevator and a passenger average waiting time, and an evaluation arithmetic operation unit for calculating a total evaluated value from an item to be evaluated of a passenger waiting time, an item to be evaluated of the running distance, and the weighting factor determined by the parameter calculating unit. The elevator group control apparatus selects an elevator whose total evaluated value is the best from among the plurality of elevators, and assigns a hall call to the selected elevator.

10 Claims, 11 Drawing Sheets

FOREIGN PATENT DOCUMENTS

| | | |
|---|---|---|
| DE | 698 02 876 T2 | 6/2002 |
| JP | 51 21638 | 2/1976 |
| JP | 54 102745 | 8/1979 |
| JP | 54 159955 | 12/1979 |
| JP | 58 11479 | 1/1983 |
| JP | 59 82279 | 5/1984 |
| JP | 60 106774 | 6/1985 |
| JP | 10 36019 | 2/1998 |
| JP | 10-194619 | 7/1998 |
| JP | 2002 167129 | 6/2002 |
| WO | WO 2005/092762 A1 | 10/2005 |
| WO | 2007 049342 | 5/2007 |

* cited by examiner

| | | Destination Floor | | | | | | | | | |
|---|---|---|---|---|---|---|---|---|---|---|---|
| | | 1F | 2F | 3F | 4F | 5F | 6F | 7F | 8F | 9F | 10F |
| Starting Floor | 1F | 0 | 2 | 2 | 2 | 2 | 2 | 2 | 2 | 2 | 2 |
| | 2F | 1.111 | 0 | 1 | 1 | 1 | 1 | 1 | 1 | 1 | 1 |
| | 3F | 1.111 | 1 | 0 | 1 | 1 | 1 | 1 | 1 | 1 | 1 |
| | 4F | 1.111 | 1 | 1 | 0 | 1 | 1 | 1 | 1 | 1 | 1 |
| | 5F | 1.111 | 1 | 1 | 1 | 0 | 1 | 1 | 1 | 1 | 1 |
| | 6F | 1.111 | 1 | 1 | 1 | 1 | 0 | 1 | 1 | 1 | 1 |
| | 7F | 1.111 | 1 | 1 | 1 | 1 | 1 | 0 | 1 | 1 | 1 |
| | 8F | 1.111 | 1 | 1 | 1 | 1 | 1 | 1 | 0 | 1 | 1 |
| | 9F | 1.111 | 1 | 1 | 1 | 1 | 1 | 1 | 1 | 0 | 1 |
| | 10F | 1.111 | 1 | 1 | 1 | 1 | 1 | 1 | 1 | 1 | 0 |

|  | Destination Floor | |
|---|---|---|
| | From Underground Floor to 1F (Zone 1) | From 2F to Upper Floors (Zone 2) |
| Starting Floor — From Underground Floor to 1F (Zone 1) | A | B |
| Starting Floor — From 2F to Upper Floors (Zone 2) | C | D |

A, B, C, and D Are Normalized in Such a Way
That They Satisfy A+B+C+D=100

ELEVATOR GROUP CONTROL APPARATUS

FIELD OF THE INVENTION

The present invention relates to an elevator group control apparatus which employs a plurality of elevators efficiently.

BACKGROUND OF THE INVENTION

In a case in which a plurality of elevators are installed in a building, an elevator group control apparatus is disposed to employ the plurality of elevators efficiently to reduce the passenger waiting time.

The elevator group control apparatus is aimed at reducing the passenger waiting time, and also achieving energy conservation.

For example, an elevator group control apparatus disclosed by patent reference 1 which will be mentioned below is so constructed as to set up a receivable number of hall calls for each floor, and, when the number of hall calls which have occurred at each floor exceeds the receivable number of hall calls, not to receive any newly-occurring hall call. Thereby, the utilization of the plurality of elevators is restricted and energy conservation can be achieved.

However, at a floor at which the number of hall calls which have occurred exceeds the receivable number of hall calls, the passengers at the floor cannot board any one of the elevators and a very inconvenient status occurs.

In contrast, when the number of hall calls which have occurred is less than the receivable number of hall calls, no energy conservation is achieved because the utilization of the plurality of elevators is not restricted.

An elevator group control apparatus disclosed by patent references 2 which will be mentioned below, in a case of carrying out standby control when there are few passengers, estimates the probability of occurrence of hall calls at each floor.

Then, when there are a plurality of floors at each of which its probability of occurrence of hall calls falls within a predetermined range, the elevator group control apparatus selects, as a waiting floor, a floor which is close to a left elevator from among the plurality of floors at each of which its probability of occurrence of hall calls falls within the predetermined range, and makes an elevator be on standby at the waiting floor. As a result, compared with a case in which a fixed floor is made to be the waiting floor, the distance over which an elevator is made to travel to the waiting floor can be reduced, and therefore energy conservation can be achieved.

However, in this case, energy conservation is restrictly achieved only during off-peak times when the number of passengers is small with a little movement of each elevator, and the running distance over which an elevator is made to travel toward the waiting floor is not so long. Therefore, the energy conservation effect is restricted.

[Patent reference 1] JP,2002-167129,A (see the paragraph numbers [0017] to [0021] and FIG. 1)

[Patent reference 2] JP,10-36019,A (see the paragraph number and FIG. 2)

Because conventional elevator group control apparatuses are constructed as mentioned above, when the number of hall calls which have occurred at each floor exceeds the receivable number of hall calls, if a measure of not receiving any newly-occurring hall call is taken against this event, the utilization of the plurality of elevators is restricted and energy conservation is achieved. However, at a floor at which the number of hall calls which have occurred exceeds the receivable number of hall calls, the passengers at the floor cannot board any elevator and a very inconvenient status occurs. A further problem is that, when the number of hall calls which have occurred is less than the receivable number of hall calls, no energy conservation is achieved because the utilization of the plurality of elevators is not restricted.

Furthermore, in a case in which a floor at which the probability of occurrence of hall calls falls within a predetermined range is made to be a waiting floor, compared with a case in which a fixed floor is made to be the waiting floor, the distance over which an elevator is made to travel to the waiting floor can be reduced, and therefore energy conservation can be achieved. Another problem is, however, that because, while energy conservation is achieved, the energy conservation is restricted to during off-peak times when the number of passengers is small with a little movement of each elevator, and the running distance over which an elevator is made to travel toward the waiting floor is not so long, the energy conservation effect is restricted.

The present invention is made in order to solve the above-mentioned problems, and it is therefore an object of the present invention to provide an elevator group control apparatus which can reduce the travelling distance of each elevator without causing occurrence of an inconvenient status in which, for example, the passenger waiting time becomes long, thereby enhancing the energy conservation effect.

DISCLOSURE OF THE INVENTION

In accordance with the present invention, there is provided an elevator group control apparatus which includes: a weighting factor determining means for determining a weighting factor for an item to be evaluated which is calculated from a running distance estimated by an estimation arithmetic operation means by taking into consideration a relation between a running distance of an elevator and a passenger waiting time; and a total evaluated value calculating means for calculating a total evaluated value of each of a plurality of elevators from an item to be evaluated of the passenger waiting time, the item to be evaluated of the above-mentioned running distance, and the weighting factor determined by the above-mentioned weighting factor determining means, and which selects an elevator whose total evaluated value is the best from among the plurality of elevators, and then assigns a hall call to the selected elevator.

In accordance with the present invention, the elevator group control apparatus is so constructed as to include: the weighting factor determining means for determining the weighting factor for the item to be evaluated which is calculated from the running distance estimated by the estimation arithmetic operation means by taking into consideration the relation between the running distance of an elevator and the passenger waiting time; and the total evaluated value calculating means for calculating a total evaluated value of each of the plurality of elevators from the item to be evaluated of the passenger waiting time, the item to be evaluated of the above-mentioned running distance, and the weighting factor determined by the above-mentioned weighting factor determining means, and which selects an elevator whose total evaluated value is the best from among the plurality of elevators, and then assigns a hall call to the selected elevator. Therefore, the present invention offers an advantage of being able to reduce the running distance of each elevator without causing occurrence of an inconvenient status, such as an increase in the passenger waiting time, thereby enhancing the energy conservation effect.

BRIEF DESCRIPTION OF THE FIGURES

FIG. 7 is an explanatory drawing of an OD table showing relative traffic between two zones;

FIG. 9 is an explanatory drawing showing a status in which a hall call has occurred, and so on;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
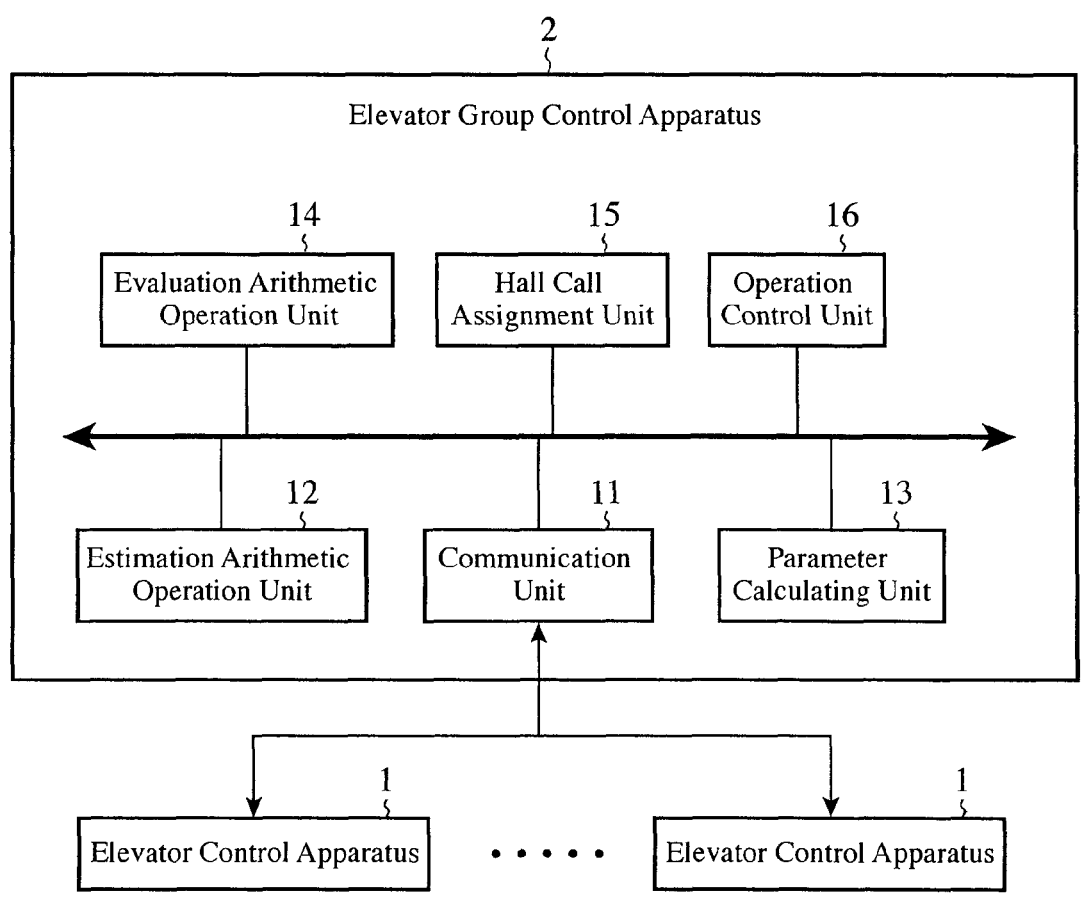
FIG. 1 is a block diagram showing an elevator group control apparatus in accordance with Embodiment 1 of the present invention.

FIG. 1 is a block diagram showing an elevator group control apparatus in accordance with Embodiment 1 of the present invention. In the figure, an elevator control apparatus 1 is disposed for each and every elevator installed in a building and controls a corresponding elevator under an instruction from the elevator group control apparatus 2.

The elevator group control apparatus 2 carries out a process of, when a hall call has occurred, assigning the hall call to an appropriate elevator, and so on.

A communication unit 11 of the elevator group control apparatus 2 has a communication interface for carrying out data communications with an elevator control apparatus 1. For example, the communication unit acquires running information from an elevator control apparatus 1, the running information including the current position of a corresponding elevator, a floor at which a hall call has occurred, the direction of the hall call, the running direction of the elevator (the upward or downlink direction), and the destination floor.

When a new hall call has occurred at a floor, an estimation arithmetic operation unit 12 of the elevator group control apparatus 2 performs an operation of estimating the running time required for each elevator to run from its current position to the floor at which the hall call has occurred in response to the hall call if assigning the hall call to each elevator, an operation of estimating both the running distance over which each elevator runs from its current position to the floor at which the hall call has occurred in response to the hall call, and the running distance over which each elevator runs from the floor at which the hall call has occurred to the destination floor of each passenger at the floor at which the hall call has occurred, and so on.

However, in a status in which no other hall calls have occurred when the new hall call has occurred, the estimation arithmetic operation unit 12 performs an operation of estimating the running time required for each elevator to run from its current position to the floor at which the new hall call has occurred, the running distance over which each elevator runs from its current position to the floor at which the new hall call has occurred, and the running distance over which each elevator runs from the floor at which the hall call has occurred to the destination floor of each passenger at the floor at which the hall call has occurred, whereas in a status in which another hall call has already occurred when the new hall call has occurred, the estimation arithmetic operation unit performs not only the estimation operation about the floor at which the new hall call has occurred, but also an operation of estimating the running time required for each elevator to run from its current position to the floor at which the other hall call has occurred, the running distance over which each elevator runs from its current position to the floor at which the other hall call has occurred, and the running distance over which each elevator runs from the floor at which the other hall call has occurred to the destination floor of each passenger at the floor at which the other hall call has occurred. Furthermore, in a status in which another hall call and a car call have already occurred when the new hall call has occurred, the estimation arithmetic operation unit performs not only the estimation operation about the floor at which the new hall call has occurred, but also an operation of estimating the running time required for each elevator to run from its current position to the floor at which the other hall call has occurred, the running time required for each elevator to run from its current position to the floor at which the car call has occurred, the running distance over which each elevator runs from its current position to the floor at which the other hall call has occurred, the running distance over which each elevator runs from its current position to the floor at which the car call has occurred, and the running distance over which each elevator runs from the floor at which the other hall call has occurred to the destination floor of each passenger at the floor at which the other hall call has occurred.

The estimation arithmetic operation unit 12 constructs an estimation arithmetic operation means.

A parameter calculating unit 13 of the elevator group control apparatus 2 takes into consideration a relation between the reduction rate of the running distance of each elevator and the improvement rate of the average passenger waiting time and uses at least one or more of parameters indicating the traffic conditions (e.g., the traffic and the traffic pattern), the elevator specifications (e.g., the rated speed, the acceleration, the number of elevators (the number of cars), the elevator capacity (the car capacity), the door opening and closing time), the building specifications (e.g., the floor height, the express zone distance, and the number of floors), and the elevator control state (e.g., whether or not an operation mode is suitable) to perform a process of determining a weighting factor $w_4$ for an item to be evaluated which is calculated from the running distance of each elevator which is estimated by the estimation arithmetic operation unit 12. The parameter calculating unit 13 constructs a weighting factor determining means.

An evaluation arithmetic operation unit 14 of the elevator group control apparatus 2 carries out a process of calculating an total evaluated value J(i) of each elevator with the total evaluated value having, as items to be evaluated, the running distance which is multiplied by the weighting factor $w_4$ determined by the parameter calculating unit 13, the running time, and so on. The evaluation arithmetic operation unit 14 constructs a total evaluated value calculating means.

A hall call assignment unit 15 of the elevator group control apparatus 2 carries out a process of selecting an elevator whose total evaluated value J(i) calculated by the evaluation arithmetic operation unit 14 is the best from among the plurality of elevators, and then assigning the hall call to the selected elevator. The hall call assignment unit 15 constructs a hall call assignment means.

An operation control unit 16 of the elevator group control apparatus 2 carries out a process of controlling the elevator control apparatuses 1 according to the assignment result of the hall call assignment unit 15.

In the example of FIG. 1, it is assumed that the communication unit 11, the estimation arithmetic operation unit 12, the parameter calculating unit 13, the evaluation arithmetic operation unit 14, the hall call assignment unit 15, and the operation control unit 16 which are the components of the elevator group control apparatus 2 consist of a piece of hardware for exclusive use (e.g., a semiconductor integrated circuit substrate on which an MPU and so on are mounted). In a case in which the elevator group control apparatus 2 consists of a computer, a program in which the descriptions of the processes of the communication unit 11, the estimation arithmetic operation unit 12, the parameter calculating unit 13, the evaluation arithmetic operation unit 14, the hall call assignment unit 15, and the operation control unit 16 are described can be stored in a memory of the computer, and the CPU of the computer can execute the program stored in the memory.

Figure 2:
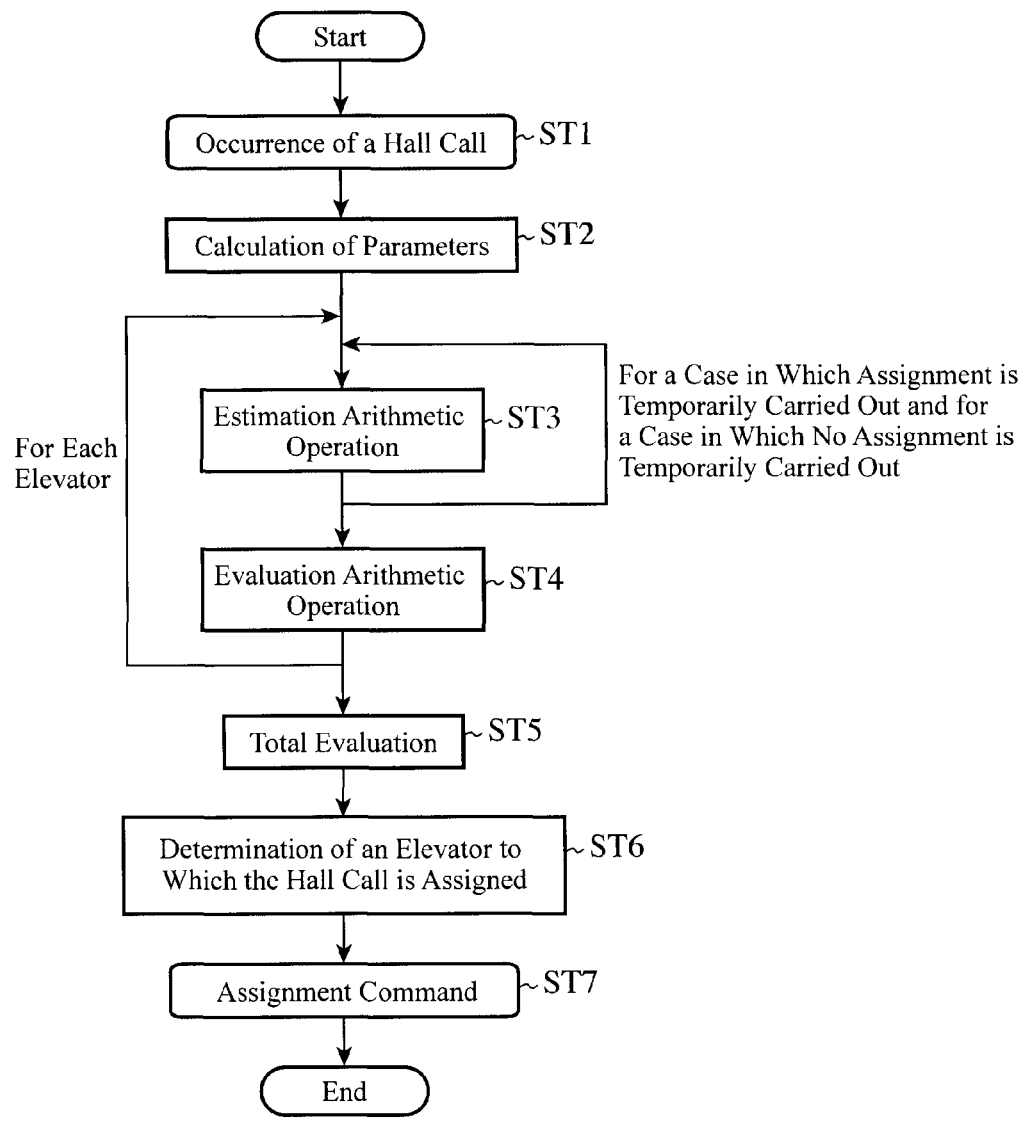
FIG. 2 is a flow chart showing the description of processing carried out by the elevator group control apparatus in accordance with Embodiment 1 of the present invention.

FIG. 2 is a flow chart showing the description of processing carried out by the elevator group control apparatus in accordance with Embodiment 1 of the present invention.

Next, the operation of the elevator group control apparatus will be explained.

As will be mentioned below in detail, the evaluation arithmetic operation unit 14 of the elevator group control apparatus 2 calculates the total evaluated value J(i) of each elevator i as shown in the following equation (1):

$$J(i)=w_1E_1(i)+w_2E_2(i)+w_3E_3(i)+w_4E_4(i) \quad (1)$$

$E_1(i)$: an evaluated value of the passenger waiting time which, when a new hall call is assigned to the elevator i, has elapsed until the elevator i reaches the floor at which the new call floor has occurred (i.e., an evaluated value of the running time required for the elevator i to run from its current position to the floor at which the hall call has occurred);

$E_2(i)$: an evaluated value of the probability that the prediction to the hall call will be incorrect when the new hall call is assigned to the elevator i;

$E_3(i)$: an evaluated value of the probability that the elevator i will be crowded when the new hall call is assigned to the elevator i; and $E_4(i)$: an evaluated value of the running distance over which the elevator i runs from its current position until making a stop when the new hall call is assigned to the elevator i.

$w_1$: a weighting factor for the evaluated value $E_1(i)$ of the waiting time;

$w_2$: a weighting factor for the evaluated value $E_2(i)$ of the prediction incorrect probability;

$w_3$: a weighting factor for the evaluated value $E_3(i)$ of the crowded probability; and $w_4$: a weighting factor for the evaluated value $E_4(i)$ of the running distance.

When a new hall call has occurred, the estimation arithmetic operation unit 12 carries out an estimation arithmetic operation of estimating the running time, the prediction incorrect probability, the crowded probability, and the running distance of the elevator i, as to each of the new hall call and an already-allocated hall call, from status information, such as the current position and running direction of the elevator i, the already-allocated hall call, and a car call. Therefore, the evaluated values $E_1(i)$ to $E_4(i)$ are derived from the estimation arithmetic operation results. As a method of implementing these estimation arithmetic operations, there has been disclosed, for example, a method shown in JP,54-102745,A. In the method shown in JP,54-102745,A, an elevator is virtually moved from its current position to every floor along its moving direction, and its running times between floors are accumulated. The total running time which is obtained by accumulating the running times until the elevator reaches the floor at which the hall call has occurred is acquired as an estimation arithmetic operation result. As to the estimation arithmetic operation methods of estimating the prediction incorrect probability, the crowded probability, and the running distance, there can be considered application of estimation arithmetic operation methods disclosed in JP,54-102745,A to the estimation arithmetic operation on the items.

After the evaluation arithmetic operation unit 14 calculates the total evaluated value J(i) of the elevator i, the hall call assignment unit 15 of the elevator group control apparatus 2 carries out a process of selecting an elevator whose total evaluated value J(i) is the best (i.e., an elevator whose total evaluated value J(i) is the largest or smallest), and then assigning the hall call to the selected elevator.

When the hall call assignment unit 15 determines an elevator which has to answer the hall call, the hall call assignment unit cannot assume that the elevator which is the closest to the floor at which the hall call has occurred is the car which can answer the hall call at the earliest time.

This is because when the elevator which is the closest to the floor at which the hall call has occurred needs to stop at a floor on the way from its current position to the floor at which the hall call has occurred, if there is another elevator which can pass directly to the floor at which the hall call has occurred without stopping at any floor on the way even though the other elevator is at a further distance from the floor at which the hall call has occurred, this elevator can reach the floor at which the hall call has occurred at an earlier time.

Therefore, although the running distance can be reduced and the energy conservation effect can be enhanced by placing prime importance on the evaluated value $E_4(i)$ of the running distance among the evaluated values $E_1(i)$ to $E_4(i)$, there is a possibility that the passenger waiting time become long and the transport efficiency becomes worse.

To solve this problem, in accordance with this Embodiment 1, in order to enhance the energy conservation effect without causing any drop in the transport efficiency, the weighting factor $w_4$ for the evaluated value $E_4(i)$ of the running distance is set to an appropriate value.

Hereafter, the description of this Embodiment 1 will be explained concretely.

For example, when a passenger pushes a hall call button installed in a boarding area for the elevators to cause a new hall call to occur (step ST1), the communication unit 11 of the elevator group control apparatus 2 acquires running information, such as the current position of each elevator i, the floor at which the hall call has occurred, the direction of the hall call, the running direction (the upward or downlink direction), the destination floor, and so on from the elevator control apparatus 1 of each and every elevator i.

In this Embodiment 1, the communication unit also acquires the destination floor by imagining a case of using a destination floor registration method of being able to also register the destination floor, though the communication unit does not have to certainly acquire the destination floor.

The parameter calculating unit 13 of the elevator group control apparatus 2 takes into consideration the relation between the reduction rate of the running distance of each elevator and the improvement rate of the average passenger waiting time and uses at least one or more of the parameters indicating the traffic conditions (e.g., the traffic and the traffic pattern), the elevator specifications (e.g., the rated speed, the acceleration, the number of elevators (the number of cars), the elevator capacity (the car capacity), the door opening and closing time), the building specifications (e.g., the floor height, the express zone distance, and the number of floors), and the elevator control state (e.g., whether or not an operation mode is suitable) to calculate the weighting factor $w_4$ for the evaluated value $E_4(i)$ of the running distance which is estimated by the estimation arithmetic operation unit 12 (step ST2).

The parameter calculating unit 13 uses, for example, the following equation (2) to calculate the weighting factor $w_4$ for the evaluated value $E_4(i)$ of the running distance.

$$w_4 = f(P, Q, R, S, C) \quad (2)$$

where a reference character P denotes the traffic, a reference character Q denotes a traffic pattern variable showing the traffic pattern, a reference character R denotes an elevator specification variable showing the features of the elevator specifications, a reference character S denotes a building specification variable showing the features of the building specifications, and a reference character C denotes a control parameter influential variable showing the elevator control state.

The function f is determined on the basis of a relation between the weighting factors $w_4$ and P, Q, R, S, and C, which was experimentally acquired through a prior simulation experiment or the like.

Hereafter, a procedure for determining the equation (2) will be explained.

As mentioned above, the elevator group control apparatus calculates the total evaluated value J(i) given by the equation (1), and assigns the new hall call to the elevator i whose total evaluated value J(i) is the best.

Figure 3:
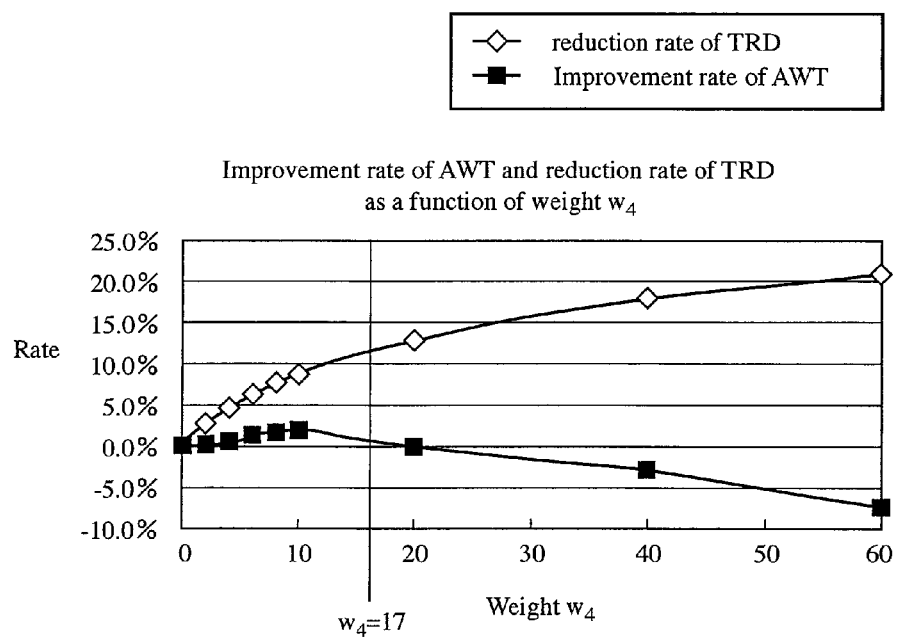
FIG. 3 is a graph showing a relation between the reduction rate of a total running distance per unit time and the improvement rate of a passenger average waiting time per unit time with respect to a change in a weighting factor $w_4$.

FIG. 3 shows an experimental result showing a relation between the reduction rate of the total running distance (TRD: total running distance) per unit time and the improvement rate of the passenger average waiting time (AWT: average waiting time) per unit time with respect to a change in the weighting factor $w_4$.

As shown in FIG. 3, there is a tendency for the amount of reduction of the running distance to increase and hence for the passenger average waiting time to become worse as the weighting factor $w_4$ for the evaluated value $E_4(i)$ of the running distance becomes large. This is because when the weighting factor $w_4$ increases, the priority of the evaluated value $E_4(i)$ of the running distance becomes high in the total evaluated value J(i) given by the equation (1), and, in contrast with this, the priority of the evaluated value $E_1(i)$ of the waiting time becomes low.

Therefore, it is understood that, in the example of FIG. 3, it is necessary to provide the equation (2) in such a way that $w_4$ is close to 17 in order to acquire the largest amount of reduction of the running distance within the limits of not making the average waiting time become worse.

The function f of $w_4$ has to be set up in such a way as to vary with respect to P, Q, R, S, and C. Hereafter, for the sake of simplicity, a case in which $E_4(i)$ is a linear or higher-order polynomial monotonously increasing function which increases with respect to the distance is considered.

$$E_4(i) = \Sigma(\text{running distance})^n \; n >= 1$$

At this time, the rate of increase in the passenger waiting time to increase in the evaluated value $E_4(i)$ of the running distance is small. This is because stop times, such as boarding and exiting times independent of the running distance, and door opening and closing time, are included in the waiting time. Therefore, the function f of the weighting factor is set up in such a way as to monotonously decrease with respect to the evaluated value $E_4(i)$ of the running distance (the express zone distance, the floor height, or the number of floors).

When the number of cars increases, the rate of reduction in the passenger waiting time to the increase in the evaluated value $E_4(i)$ of the running distance becomes large. This is because even if the number of cars increases, the running distance hardly changes while the waiting time decreases in proportion to the inverse of the number of cars when simplified. Therefore, the function f of the weighting factor is set up in such a way as to monotonously decrease with respect to the number of cars.

For example, a case in which $E_4(i)$ is alternatively a linear or higher-order polynomial monotonously decreasing function which decreases with respect to the running distance (the express zone distance, the floor height, or the number of floors) is considered.

$$E_4(i) = -\Sigma(\text{running distance})^n \; n >= 1$$

At this time, the rate of reduction in the passenger waiting time to reduction of the evaluated value $E_4(i)$ of the running distance is small in contrast to the previously-explained case. Therefore, the function f of the weighting factor is set up in such a way as to monotonously increase with respect to the running distance (the express zone distance, the floor height, or the number of floors).

When the number of cars increases, the rate of reduction in the passenger waiting time to the decrease in the evaluated value $E_4(i)$ of the running distance becomes large. This is because even if the number of cars increases, the running distance hardly changes while the waiting time decreases in proportion to the inverse of the number of cars when simplified. Therefore, the function f of the weighting factor is set up in such a way as to monotonously decrease with respect to the number of cars.

Figure 4:
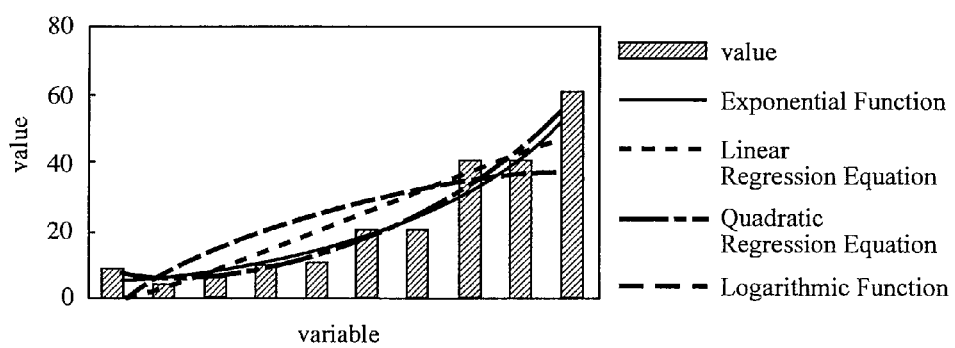
FIG. 4 is an explanatory drawing showing a relation between variables (P, Q, R, S, and C) and the weighting factor $w_4$.
Figures 5, 6:
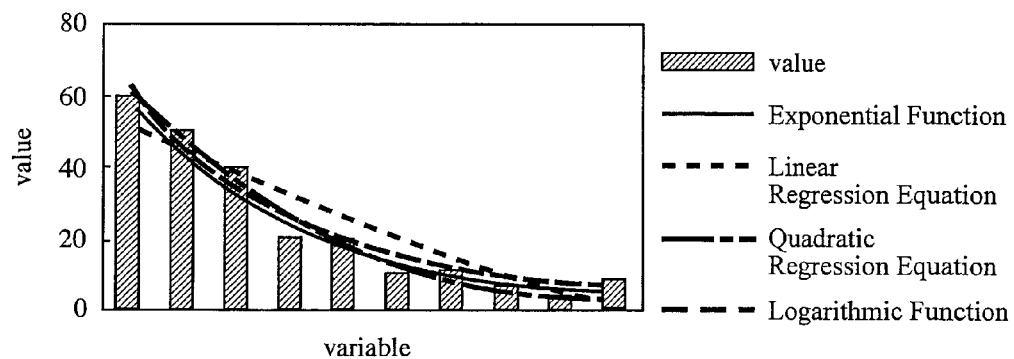
FIG. 5 is an explanatory drawing showing a relation between the variables (P, Q, R, S, and C) and the weighting factor $w_4$.
FIG. 6 is an explanatory drawing showing an OD table.

Although only the running distance and the number of cars are described in the above-mentioned cases, the function f is set up in such a way that $w_4$ similarly varies with respect to P, Q, R, S, and C. For example, it is assumed that, as a result of carrying out a simulation experiment, within the limits of not making the average waiting time become worse, the value (value) of the weighting factor $w_4$ which provides the largest amount of reduction in the running distance shows a change as shown in FIG. 4 or 5 with a change in one of the variables (P, Q, R, S, and C).

When this relation becomes clear, from the value (value) of the weighting factor $w_4$ which was estimated experimentally, there can be provided, for example, the following N-order regression equation:

$$w_4 = \{\alpha_{P\_N}(P)^N + \alpha_{P\_(N-1)}(P)^{N-1} + \ldots + \alpha_{P\_1}(P) + \gamma_{1\_P}\} \times \{\alpha_{Q\_N}(Q)^N + \alpha_{Q\_(N-1)}(Q)^{N-1} + \ldots + \alpha_{Q\_1}(Q) + \gamma_{1\_Q}\} \times \{\alpha_{R\_N}(R)^N + \alpha_{R\_(N-1)}(R)^{N-1} + \ldots + \alpha_{R\_1}(R) + \gamma_{1\_R}\} \times \{\alpha_{S\_N}(S)^N + \alpha_{S\_(N-1)}(S)^{N-1} + \ldots + \alpha_{S\_1}(S) + \gamma_{1\_S}\} \times \{\alpha_{C\_N}(C)^N + \alpha_{C\_(N-1)}(C)^{N-1} + \ldots + \alpha_{C\_1}(C) + \gamma_{1\_P}\}$$ (3)

As an alternative, there can be provided, for example, the following exponential regression equation:

$$w_4 = \{\alpha_{e\_1}(e)^{(\beta-p)(P)} + \gamma_{2\_P}\} \times \{\alpha_{e\_2}(e)^{(\beta-q)(Q)} + \gamma_{2\_Q}\} \times \{\alpha_{e\_3}(e)^{(\beta-r)(R)} + \gamma_{2\_R}\} \times \{\alpha_{e\_4}(e)^{(\beta-s)(S)} + \gamma_{2\_S}\} \times \{\alpha_{e\_5}(e)^{(\beta-c)(C)} + \gamma_{2\_C}\}$$ (3')

As an alternative, there can be provided, for example, the following logarithmic regression equation:

$$w_4 = \{\alpha_{1\_P}\mathrm{Ln}(P) + \gamma_{3\_P}\} \times \{\alpha_{1\_Q}\mathrm{Ln}(Q) + \gamma_{3\_Q}\} \times \{\alpha_{1\_R}\mathrm{Ln}(R) + \gamma_{3\_R}\} \times \{\alpha_{1\_S}\mathrm{Ln}(S) + \gamma_{3\_S}\} \times \{\alpha_{1\_C}\mathrm{Ln}(C) + \gamma_{3\_C}\}$$ (3'')

$\alpha_{P\_N}, \alpha_{P\_(N-1)}, \ldots, \alpha_{P\_1}, \alpha_{Q\_N}, \alpha_{Q\_(N-1)}, \ldots, \alpha_{Q\_1}, \alpha_{R\_N}, \alpha_{R\_(N-1)}, \ldots, \alpha_{R\_1}, \alpha_{S\_N}, \alpha_{S\_(N-1)}, \ldots, \alpha_{S\_1}, \alpha_{C\_N}, \alpha_{C\_(N-1)}, \ldots, \alpha_{C\_1}, \alpha_{e\_1}, \alpha_{e\_2}, \alpha_{e\_3}, \alpha_{e\_4}, \alpha_{e\_5}, \beta\_p, \beta\_q, \beta\_r, \beta\_s, \beta\_c, \gamma_{1\_P}, \gamma_{1\_Q}, \gamma_{1\_R}, \gamma_{1\_S}, \gamma_{1\_C}, \gamma_{2\_P}, \gamma_{2\_Q}, \gamma_{2\_R}, \gamma_{2\_S}, \gamma_{2\_C}, \gamma_{3\_P}, \gamma_{3\_Q}, \gamma_{3\_R}, \gamma_{3\_S},$ and $\gamma_{3\_C}$ in the equations (3), (3'), and (3'') are set up in such a way that the value (value) of the weighting factor $w_4$ which was estimated experimentally as shown in FIG. 4 or FIG. 5 and errors are reduced.

In FIG. 4 or 5, values expressed by a linear regression equation and a quadratic regression equation are written together. Generally, a higher-order regression equation can express the value which was estimated experimentally with a higher degree of accuracy. In FIG. 4 or 5, values expressed by an exponential regression equation and a logarithmic regression equation are written together. Depending upon the value which was estimated experimentally, the exponential function, the logarithmic function, or the like can express the value with a higher degree of accuracy than that with which a higher-order polynomial expresses the value. Furthermore, depending upon the value which was estimated experimentally, a function which is a combination of an Nth-order polynomial and an exponential function or a logarithmic function can express the value with a higher degree of accuracy.

This embodiment is explained above by assuming that the elevator group control apparatus is aimed at carrying out operation control in such a way as to provide the largest amount of reduction in the running distance within the limits of not making the average waiting time become worse.

However, the aim of the designer of the elevator group control apparatus or user requests can change a judgment of, in the graph of FIG. 3, whether to carry out operation control in such a way as to provide the largest amount of reduction in the running distance within the limits of not making the average waiting time become worse at all, or to carry out operation control by either permitting a certain amount of drop in the transport efficiency and then setting the weighting factor $w_4$ to be a larger value than "17" in such a way that a larger amount of reduction is obtained in the running distance, or setting the weighting factor $w_4$ to be a smaller value than "17" in such a way that the amount of reduction in the running distance and the improvement rate of the average waiting time can be accepted little by little.

Not only the judgment about the waiting time but a judgment of which the prediction incorrect probability or the crowded probability of the equation (1), or the amount of reduction in the running distance is given a higher priority to what extent can be changed by the aim of the designer of the elevator group control apparatus or user requests. Because the appropriate value of the weighting factor $w_4$ differs dependently upon the judgment, in what type of form the equation (2) is provided by using P, Q, R, S, and C depends upon the judgment.

Hereafter, the traffic P, the traffic pattern variable Q, the elevator specification variable R, the building specification variable S, and the control parameter influential variable C in the equation (2) will be explained.

The parameter calculating unit 13 calculates the traffic P by using, for example, the following equation (4):

$$P = (P\mathrm{sum})/(LD \times T)$$ (4)

Because the traffic P is a parameter which can vary even after the elevators are made to start operating, "Psum" in the equation (4) is derived every unit time (T) from the sum of the numbers of passengers boarding and exiting at all the floors, which are estimated from data about the number of passengers, information about call buttons, and so on which are transmitted from the elevator control apparatuses 1.

Furthermore, "LD" in the equation (4) shows the number of passengers (the transport capacity) which can be conveyed by each elevator per one second. On the basis of the 5-minute transport capacity which can be calculated by using a traffic calculating method described in, for example, "An elevator planning guide for architectural design and construction" (issued by Japan Elevator Association), LD is calculated from the following equation (5):

$$LD = (\text{5-minute transport capacity per unit}) \times M/300$$ (5)

where M is the number of elevators.

The parameter calculating unit 13 calculates the traffic pattern variable Q by using, for example, the following equation (6):

$$Q = g(OD\text{ table})$$ (6)

The function g in the equation (6) is determined on the basis of a relation between the OD table, which was experimentally acquired through a prior simulation experiment or the like, and the traffic pattern variable Q.

FIG. 6 is an explanatory drawing showing the OD table.

Values in the OD table of FIG. 6 show relative numeric values of the traffic between floors. For example, a numeric value "2" in the starting floor 1F and the destination floor 10F means that the percentage of those who move from 1F to 10F per unit time is 2% of the whole number of passengers.

Because the OD table can vary even after the elevators are made to start operating, the OD table is derived every unit time (T) from the sum of the numbers of passengers boarding and exiting at all the floors, which are estimated from the data about the number of passengers, the information about call buttons, and so on which are transmitted from the elevator control apparatuses 1.

Each numeric value itself in the OD table shows a feature of the traffic pattern, though when many numeric values in the OD table are used as the calculation parameters, the function g becomes complicated and the required amount of operation resources also becomes large.

In contrast, the use of only one numeric value in the OD table causes a possibility of mistaking the whole traffic pattern due to a local variation in the traffic.

Figures 7, 9:
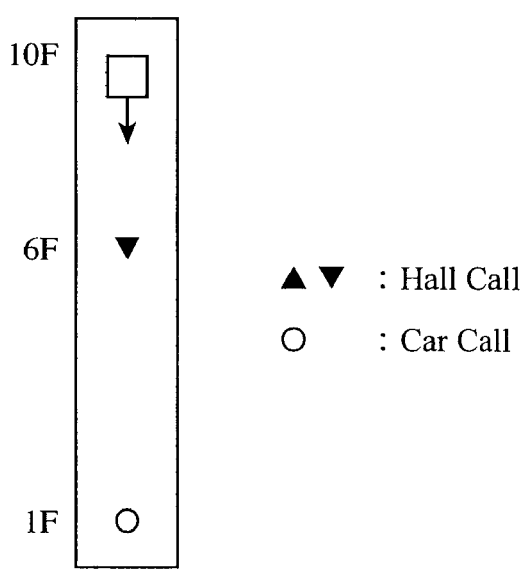

Therefore, in accordance with this Embodiment 1, an OD table expressed in a 2×2 zone array is generated as shown in FIG. 7 from the OD table of FIG. 6.

In the OD table of FIG. 7, the floors of a building are divided into two zones: a main floor zone (including underground floors and 1F) and an upper floor zone (including 2F and further upper floors), and volumes of relative traffic between the two zones are shown.

Figure 8:
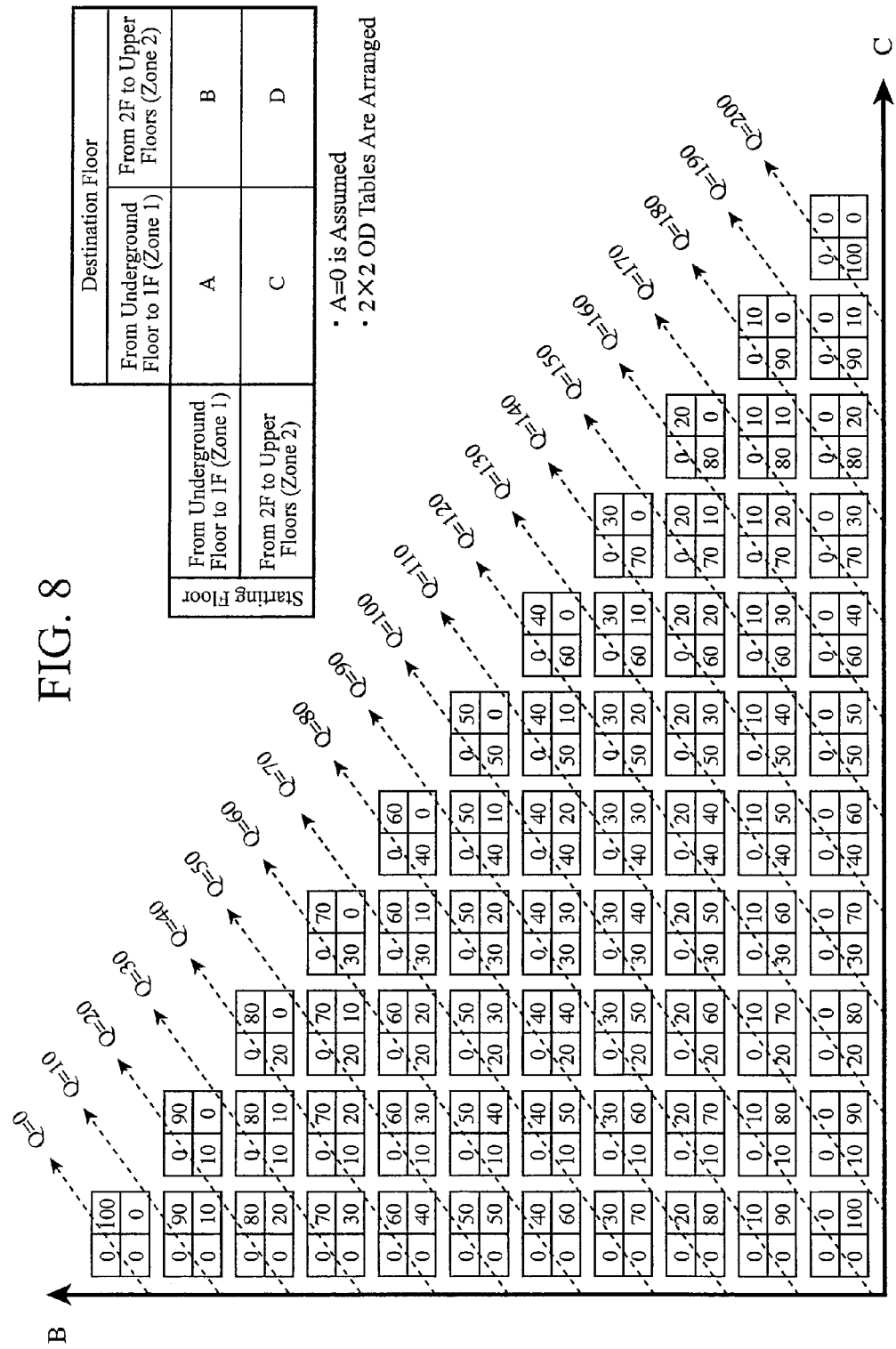
FIG. 8 is an explanatory drawing showing a case in which, assuming that the volume of traffic between a zone 1 and a zone 1 in FIG. 7 is small (A=0), a plurality of 2×2 OD tables are arranged with the values of B and C being changed.

FIG. 8 is an explanatory drawing showing a case in which, assuming that the volume of traffic between the zone 1 and the zone 1 in FIG. 7 is small (A=0), a plurality of 2×2 OD tables are arranged with the values of B and C being changed.

As shown in FIG. 7, when each OD table is normalized in such a way as to satisfy A+B+C+D=100, by fixing the value A to 0 and changing the values of B and C, the value of D is determined automatically.

In some OD tables on the same arrow of FIG. 8, their Q values shown by the following equation (7) are the same as one another. In this Embodiment 1, this Q value is handled as the traffic pattern variable.

$$Q=(100-B+C) \quad (7)$$

The parameter calculating unit 13 calculates the elevator specification variable R by using, for example, a function p given by the following equation (8):

$$R=p(\text{the rated speed, the acceleration, the elevator capacity, the number of elevators, the door opening and closing time}) \quad (8)$$

As the parameters used for the calculation of the elevator specification variable R (i.e., the parameters showing the specifications of the plurality of elevators), the rated speed, the acceleration, the elevator capacity, the number of elevators, the door opening and closing time, etc. can be provided. In general, because although the parameters showing the specifications of the plurality of elevators differ for every building to which the plurality of elevators are supplied, they are rarely changed after the plurality of elevators are made to start operating, the parameters can be stored in the elevator group control apparatus in advance through prior work.

Although it is assumed that fixed values, such as a maximum, a minimum, and an average, of each of the following parameters: the rated speed, the acceleration, and the door opening and closing time are used in the equation (8), their instantaneous values can be used instead as long as they can be detected by using, for example, sensors.

The function p of the equation (8) is determined on the basis of a relation between the rated speed, the acceleration, the elevator capacity, the number of elevators, the door opening and closing time, and so on which were experimentally acquired through a prior simulation experiment or the like, and the elevator specification variable R.

The parameter calculating unit 13 calculates the building specification variable S by using, for example, a function q given by the following equation (9):

$$S=q(\text{the floor height, the number of floors, the express zone distance}) \quad (9)$$

As the parameters used for the calculation of the building specification variable S (i.e., the parameters showing the specifications of the building), the floor height, the number of floors, the express zone distance, and so on are provided. In general, because although the parameters showing the specifications of the building, such as the floor height, the number of floors, and the express zone distance, differ for every building to which the plurality of elevators are supplied, they are rarely changed after the plurality of elevators are made to start operating, the parameters can be stored in the elevator group control apparatus in advance through prior work.

The function q of the equation (9) is determined on the basis of a relation between the floor height, the number of floors, the express zone distance, and so on which were experimentally acquired through a prior simulation experiment or the like, and the building specification variable S.

The parameter calculating unit 13 calculates the control parameter influential variable C by using, for example a function u given by the following equation (10):

$$C=u(\text{a control parameter } N) \quad (10)$$

The function u of the equation (10) is determined on the basis of a relation between the control parameter N which was experimentally acquired through a prior simulation experiment or the like, and the control parameter influential variable C. Although the number of control parameters N is one in the equation (10), this number is not limited to one.

Hereafter, the control parameter N will be explained.

In many cases, a plurality of operation modes are provided in the elevator group control apparatus.

For example, there are provided operation modes as shown below.

(1) An operation mode in which to service two or more elevators to a main floor during an UP peak period with many people who move from the main floor to upper floors so as to accomplish reduction in the waiting time.

(2) An operation mode in which to make passengers who go to the same destination floor board the same elevator as much as possible so as to increase the transport efficiency.

(3) An operation mode in which to divide upper floors above the main floor into a plurality of zones and limit floors to which each of the elevators is to be serviced during an UP peak period with many people who move from the main floor to the upper floors so as to produce an improvement in the transport efficiency.

(4) An operation mode in which to restrict the number of DOWN calls which each elevator can accept during a DOWN peak period with many people who move from upper floors to the main floor, and separately assign the plurality of elevators to hall calls in the UP direction and hall calls in the DOWN direction as much as possible, so as to accomplish reduction of the running time of each elevator and reduction in the possibility that each elevator passes through a floor with being crowded.

(5) An operation mode in which to service two or more elevators to a dining-room floor at lunchtime so as to accomplish reduction of the waiting time.

(6) An operation mode in which to increase the acceleration when the plurality of elevators are crowded so as to accomplish reduction of the running time.

(7) An operation mode in which to carry out speed control when the plurality of elevators operate in a state having a service level higher than a predetermined level so as to achieve energy conservation.

(8) An operation mode in which to restrict the number of elevators which are operating when the plurality of elevators operate in a state having a service level higher than a predetermined level so as to achieve energy conservation.

(9) An operation mode in which to assign two or more elevators to a specific floor when temporary crowdedness occurs at the specific floor due to passengers who appear suddenly so as to relieve the crowdedness.

(10) An operation mode in which to control the number of cars to be assigned to a crowded floor in real time while taking the entire traffic of the building into consideration.

These operation modes are roughly divided into two types.

One of the types is the one into which the plurality of elevators are always made to go after they start operating when determined to be applied to the plurality of elevators before they are made to start operating.

The other one is the one into which the plurality of elevators are not necessarily made to go after they start operating even when determined to be applied to the plurality of elevators before they are made to start operating. For example, the plurality of elevators can be made to go into the operation mode (1), (3), (4), (5), (7), (8), or (9) only when some operation conditions are satisfied after they are made to start operating.

In this case, the elevator group control apparatus handles a control parameter showing whether or not an operation mode is applied, and a control parameter showing whether or not the plurality of elevators are being placed in an operation mode separately.

When the operation conditions include an execution time, time information also becomes a control parameter.

When an operation mode is applied, there is a control parameter which newly occurs.

For example, it is necessary to set up the number of cars to be assigned in the operation mode (1), (5), (9), or (10), it is necessary to set up the number of zones into which the floors are divided in the operation mode (3), it is necessary to set up the number of hall calls in the DOWN direction which can be accepted in the operation mode (4), it is necessary to set up an acceleration to which the current acceleration is to be changed in the operation mode (6), it is necessary to set up a speed to which the current rated speed is to be changed and the predetermined service level in the operation mode (7), and it is necessary to set up the number of elevators which can be made to operate and the predetermined service level in the operation mode (8).

These control parameters can be fixed to have numeric values which are determined before the plurality of elevators are made to start operating, or can be changed even after the plurality of elevators are made to start operating, and each of the control parameters affects the quality of the service of a corresponding operation mode in which the plurality of elevators are placed. The determination of whether to make the control parameter of each operation mode be a fixed value or a variable is also handled as a control parameter by the elevator group control apparatus.

Next, the estimation arithmetic operation unit 12 of the elevator group control apparatus 2 carries out an estimation arithmetic operation of, when assigning a new hall call which has occurred at a floor to each elevator i, estimating the running time required for each elevator i to run from its current position to the floor at which the hall call has occurred (the floor at which the new hall call has occurred, a floor at which an already-assigned hall call has occurred, an already-assigned car call) in response to the hall call, and also carries out an estimation arithmetic operation of estimating the running distance over which each elevator i runs from its current position to the floor at which the hall call has occurred (the floor at which the new hall call has occurred, a floor at which an already-assigned hall call has occurred, an already-assigned car call) in response to the hall call, the running distance over which each elevator i runs from its current position to the destination floor of each passenger at the floor at which the hall call has occurred, the number of passengers boarding at each floor and the number of passengers exiting at each floor, and the number of passengers of each elevator depending upon the number of passengers boarding at each floor and the number of passengers exiting at each floor (step ST3).

More specifically, when a new hall call has occurred, the estimation arithmetic operation unit 12 carries out an estimation arithmetic operation of estimating the running time, the prediction incorrect probability, the crowded probability, and the running distance of each elevator i for each of the new hall call and an already-assigned hall call from status information, such as the current position and running direction of each elevator i, the already-assigned hall call, and a car call.

As an estimation arithmetic operation method which the estimation arithmetic operation unit 12 uses, for example, the method disclosed in JP,54-102745,A can be used. The control parameters other than the weighting factor $w_4$, which are, in step ST2, calculated by the parameter calculating unit 13, are used for the estimation arithmetic operation of step ST3.

When the estimation arithmetic operation unit 12 carries out an estimation arithmetic operation of estimating the running time, the prediction incorrect probability, the crowded probability, and the running distance of each elevator i for the new hall call, the evaluation arithmetic operation unit 14 of the elevator group control apparatus 2 derives the evaluated values $E_1(i)$ to $E_4(i)$ of the following items to be evaluated: the running time, the prediction incorrect probability, the crowded probability, and the running distance, from the estimation arithmetic operation results (step ST4).

For example, when an elevator is staying at 10F, as shown in FIG. 9, if a hall call has occurred at 6F, the estimation arithmetic operation results generated by the estimation arithmetic operation unit 12 show that the running time required for the elevator to reach the floor 6F at which the hall call has occurred is 10 seconds, and 15 seconds have elapsed since this hall call has occurred, the evaluation arithmetic operation unit calculates the waiting time for this hall call as being 10+15=25 seconds.

The evaluation arithmetic operation unit then carries out the evaluation for this waiting time of 25 seconds by using the predetermined evaluation function fv in such a way as shown in v=fv (25 seconds).

The evaluation arithmetic operation unit also carries out an evaluation for each of the other items, such as the crowded probability, the prediction incorrect probability, and the running distance, which the estimation arithmetic operation unit has estimated, by using a predetermined evaluation function, like in the case of the above-mentioned calculation of the evaluated value of the waiting time.

When the evaluation arithmetic operation unit 14 derives the evaluated values $E_1(i)$ to $E_4(i)$ of the following items to be evaluated: the running time, the prediction incorrect probability, the crowded probability, and the running distance, the evaluation arithmetic operation unit multiplies the evaluated values $E_1(i)$ to $E_4(i)$ by the weighting factors $w_1$ to $w_4$, respectively, as shown in the above-mentioned equation (1), and then acquires the sum total of the multiplication results to calculate the total evaluated value J(i) of each elevator i (step ST5).

The weighting factor $w_4$ is calculated by the parameter calculating unit 13, and the weighting factors $w_1$ to $w_3$ have preset fixed values or are calculated by the parameter calculating unit 13.

After the evaluation arithmetic operation unit 14 calculates the total evaluated value J(i) of each elevator i, the hall call assignment unit 15 of the elevator group control apparatus 2 selects an elevator whose total evaluated value J(i) is the best (e.g., an elevator whose total evaluated value J(i) is the largest) from among the plurality of elevators. However, in a case in which the equation (1) formed in such a way as to show that the smaller total evaluated value J(i), the better value each elevator has is adopted, the hall call assignment unit selects an elevator whose total evaluated value J(i) is the smallest.

After selecting an elevator whose total evaluated value is the best from among the plurality of elevators, the hall call assignment unit 15 carries out a process of assigning the new hall call to the selected elevator (step ST6).

The operation control unit 16 of the elevator group control apparatus 2 notifies the elevator control apparatus 1 associated with the elevator to which the hall call has been assigned by the hall call assignment unit 15 that the hall call has been assigned to the elevator (step ST7).

When receiving the notification of the assignment of the hall call from the elevator group control apparatus 2, the elevator control apparatus 1 controls the elevator to move the elevator to the floor at which the hall call has occurred.

As can be seen from the above description, in accordance with this Embodiment 1, the elevator group control apparatus is provided with the parameter calculating unit 13 for determining the weighting factor $w_4$ for the item to be evaluated which the parameter calculating unit calculates from the running distance of each elevator which is estimated by the estimation arithmetic operation unit 12 by taking into consideration the relation between the running distance of each elevator, and the average passenger waiting time, and the evaluation arithmetic operation unit 14 for calculating the total evaluated value J(i) of each elevator i from the item to be evaluated of the passenger waiting time, the item to be evaluated of the running distance, and the weighting factor $w_4$ determined by the parameter calculating unit 13, and selects an elevator whose total evaluated value J(i) is the best from among the plurality of elevators and assigns the hall call to the selected elevator. Therefore, the present embodiment offers an advantage of being able to reduce the running distance of each elevator without causing occurrence of an inconvenient status, such as an increase in the passenger waiting time, thereby enhancing the energy conservation effect.

In this Embodiment 1, the parameter calculating unit 13 uses the equation (2) to calculate the weighting factor $w_4$ for the evaluated value $E_4(i)$ of the running distance, as mentioned above. Primarily, it is ideal to provide the weighting factor $w_4$ with an equation having, as variables, all the changeable values, such as the rated speed, the acceleration, the elevator capacity, the number of elevators, the door opening and closing time, the floor height, the number of floors, the express zone distance, and the control parameter N.

It is however difficult to provide such an equation. Therefore, in this Embodiment 1, the parameters are divided roughly into five parameters (P, Q, R, S, C), and the weighting factor $w_4$ is determined from the parameters P, Q, R, S, and C. In this case, in what type of form the equation (2) is provided to determine the weighting factor $w_4$ depends on the intention of the designer of the elevator group control apparatus or user requests, as previously mentioned.

What is necessary is just to provide the functions in the equations (6), (8), (9), and (10) in such a way that the parameters P, Q, R, S, and C can be easily used in the equation (2).

In this Embodiment 1, the weighting factor $w_4$ is calculated by using the traffic, the traffic pattern, the rated speed, the acceleration, the elevator capacity, the number of elevators, the door opening and closing time, the floor height, the express zone distance, the number of floors, and the control parameter N. It is necessary to not necessarily use all the elements to calculate the weighting factor $w_4$.

However, in general, the smaller number of elements are used for the calculation of the weighting factor $w_4$, the lower degree of accuracy the calculated weighting factor $w_4$ has compared with an optimum value of the weighting factor $w_4$.

For example, if the floor height is not included in the elements used for the calculation of the weighting factor $w_4$, there is a high possibility that the calculated weighting factor $w_4$ does not have an appropriate value when the floor height is changed.

Furthermore, in this Embodiment 1, the operation of calculating the weighting factor $w_4$ is explained as an example. The control parameter calculated is not limited only to the weighting factor $w_4$. For example, other weighting factors, such as $w_1$, $w_2$, and $w_3$, can be calculated.

The weighting factor $w_4$ relatively shows what degree of importance should be placed on the evaluated value $E_4(i)$ of the running distance shown in the equation (1), compared with the other evaluated values $E_1(i)$, $E_2(i)$, and $E_3(i)$, when determining an elevator to which the hall call is to be assigned.

By changing, for example, the weighting factors $w_1$, $w_2$, and $w_3$ dynamically, instead of making the weighting factor $w_4$ have a fixed value, the operations of the plurality of elevators can be controlled in such a way that their running distances can be reduced without making the waiting time become worse much. This changing operation is equivalent to dynamically changing of the weighting factor $w_4$.

Embodiment 2

Figure 10:
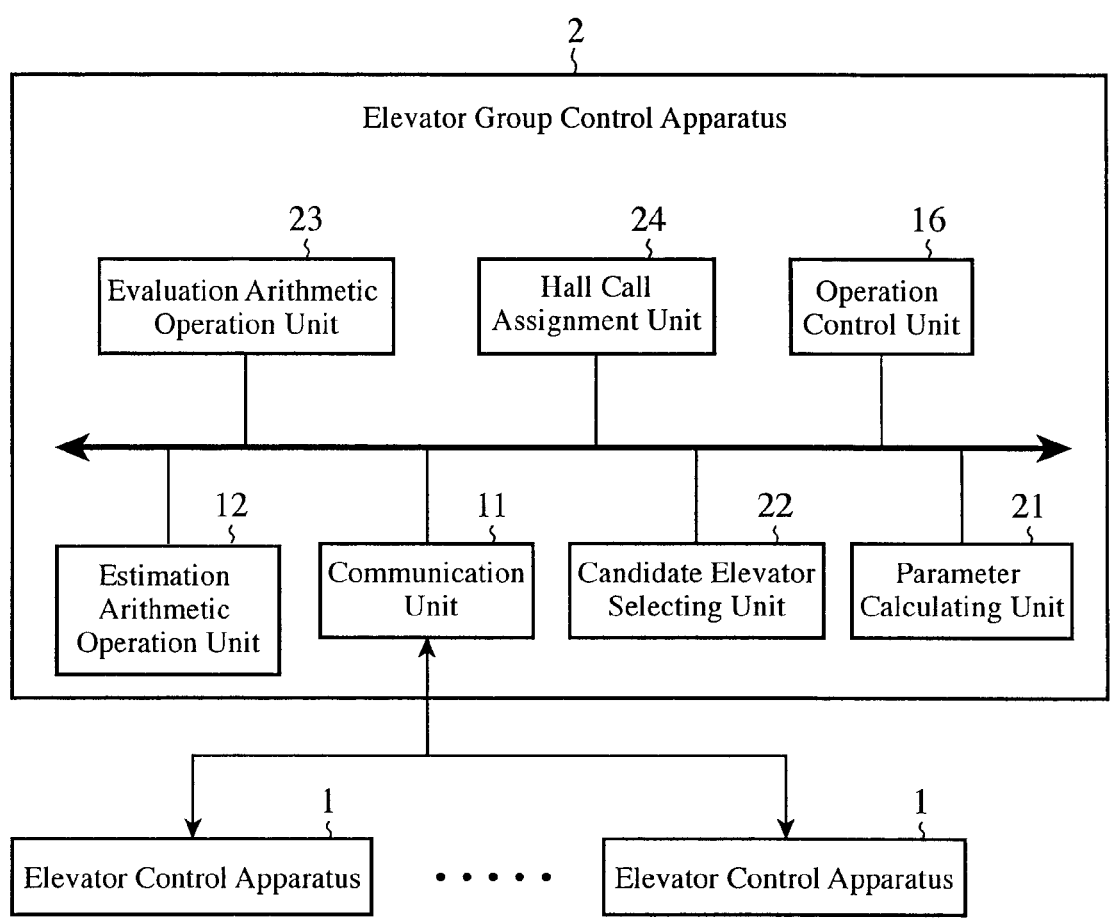
FIG. 10 is a block diagram showing an elevator group control apparatus in accordance with Embodiment 2 of the present invention.

FIG. 10 is a block diagram showing an elevator group control apparatus in accordance with Embodiment 2 of the present invention. In the figure, because the same reference numerals as those shown in FIG. 1 denote the same components or like components, the explanation of these components will be omitted hereafter.

A parameter calculating unit 21 of the elevator group control apparatus 2 takes into consideration a relation between the reduction rate of the running distance of each elevator and the improvement rate of the average passenger waiting time and uses at least one or more of the parameters indicating the traffic conditions (e.g., the traffic and the traffic pattern), the elevator specifications (e.g., the rated speed, the acceleration, the number of elevators (the number of cars), the elevator capacity (the car capacity), the door opening and closing time), the building specifications (e.g., the floor height, the express zone distance, and the number of floors), and the elevator control state (e.g., whether or not an operation mode is suitable) to carry out a process of calculating a control parameter X (a degree of rule conformance) for a selection rule (a selection rule) for selecting a candidate elevator to which the new hall call can be assigned. The parameter calculating unit 21 constructs a conformance degree calculating means.

A candidate elevator selecting unit 22 of the elevator group control apparatus 2 carries out a process of selecting, as a candidate elevator, an elevator whose control parameter X which is calculated by the parameter calculating unit 21 satisfies the selection rule from among a plurality of elevators. The candidate elevator selecting unit 22 constructs a candidate elevator selecting means.

An evaluation arithmetic operation unit 23 of the elevator group control apparatus 2 carries out a process of calculating the total evaluated value of each candidate elevator, the total evaluated value having, as an item to be evaluated, the running time of each candidate elevator which is estimated by an estimation arithmetic operation unit 12. The evaluation arithmetic operation unit 23 constructs a total evaluated value calculating means.

A hall call assignment unit 24 of the elevator group control apparatus 2 carries out a process of selecting an elevator whose total evaluated value calculated by the evaluation arithmetic operation unit 23 is the best from the candidate elevators selected by the candidate elevator selecting unit 22, and assigning the new hall call to the selected elevator. The hall call assignment unit 24 constructs a hall call assignment means.

In the example of FIG. 10, it is assumed that a communication unit 11, the estimation arithmetic operation unit 12, the parameter calculating unit 21, the candidate elevator selecting unit 22, the evaluation arithmetic operation unit 23, the hall call assignment unit 24, and an operation control unit 16 which are the components of the elevator group control apparatus 2 consist of a piece of hardware for exclusive use (e.g., a semiconductor integrated circuit substrate on which an MPU and so on are mounted). In a case in which the elevator group control apparatus 2 consists of a computer, a program in which the descriptions of the processes of the communication unit 11, the estimation arithmetic operation unit 12, the parameter calculating unit 21, the candidate elevator selecting unit 22, the evaluation arithmetic operation unit 23, the hall call assignment unit 24, and the operation control unit 16 are described can be stored in a memory of the computer, and the CPU of the computer can execute the program stored in the memory.

Figure 11:
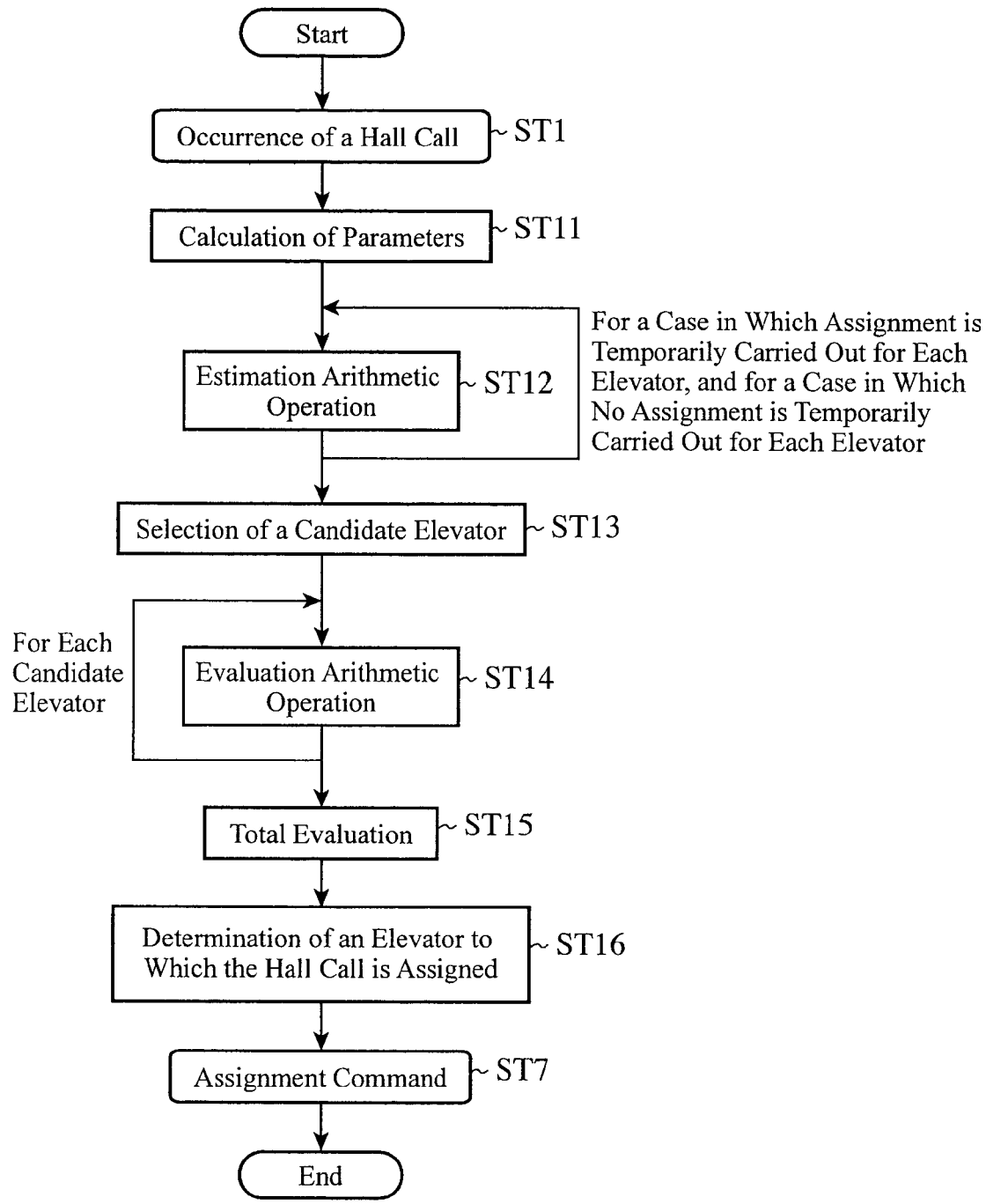
FIG. 11 is a flow chart showing the description of processing carried out by the elevator group control apparatus in accordance with Embodiment 2 of the present invention.

FIG. 11 is a flow chart showing the description of processing carried out by the elevator group control apparatus in accordance with Embodiment 2 of the present invention.

Next, the operation of the elevator group control apparatus will be explained.

For example, when a passenger pushes a hall call button installed in a boarding area for the elevators to cause a new hall call to occur (step ST1), the communication unit 11 of the elevator group control apparatus 2 acquires running information, such as the current position of each elevator i, the floor at which the hall call has occurred, the direction of the hall call, the running direction (the upward or downlink direction), the destination floor, and so on from the elevator control apparatus 1 of each elevator i, like that of above-mentioned Embodiment 1.

The parameter calculating unit 21 of the elevator group control apparatus 2 takes into consideration the relation between the reduction rate of the running distance of each elevator and the improvement rate of the passenger average waiting time to calculate the control parameter X for the selection rule for selecting a candidate elevator to which the new hall call can be assigned (step ST11). The selection rule for selecting a candidate elevator will be mentioned below.

More specifically, the parameter calculating unit 21 calculates the control parameter X for the selection rule for selecting a candidate elevator by using the traffic P, a traffic pattern variable Q, an elevator specification variable R, a building specification variable S, and a control parameter influential variable C.

For example, the parameter calculating unit calculates the control parameter X for the selection rule for selecting a candidate elevator by using the following equation (11):

$$X = f(P, Q, R, S, C) \tag{11}$$

Because a method of calculating the traffic P, the traffic pattern variable Q, the elevator specification variable R, the building specification variable S, and the control parameter influential variable C is the same as that of above-mentioned Embodiment 1, the explanation of the method will be omitted hereafter.

The function f is determined on the basis of the relation between the control parameter X which was experimentally acquired with a prior simulation experiment or the like, and P, Q, R, S and C, according to the same procedure as that used when determining the function f of the equation (2) of above-mentioned Embodiment 1.

When a new hall call occurs at a floor, the estimation arithmetic operation unit 12 of the elevator group control apparatus 2 then, like that of above-mentioned Embodiment 1, carries out an estimation arithmetic operation of estimating the running time, the prediction incorrect probability, the crowded probability, and so on of each elevator i for each of the new hall call and an already-assigned hall call from status information, such as the current position and running direction of each elevator i, the already-assigned hall call, and a car call, by assuming a case where the new hall call is assigned to each elevator i (step ST12).

The candidate elevator selecting unit 22 of the elevator group control apparatus 2 then selects, as a candidate elevator, an elevator whose control parameter X calculated by the parameter calculating unit 21 satisfies the selection rule from among the plurality of elevators (step ST13).

Figure 12:
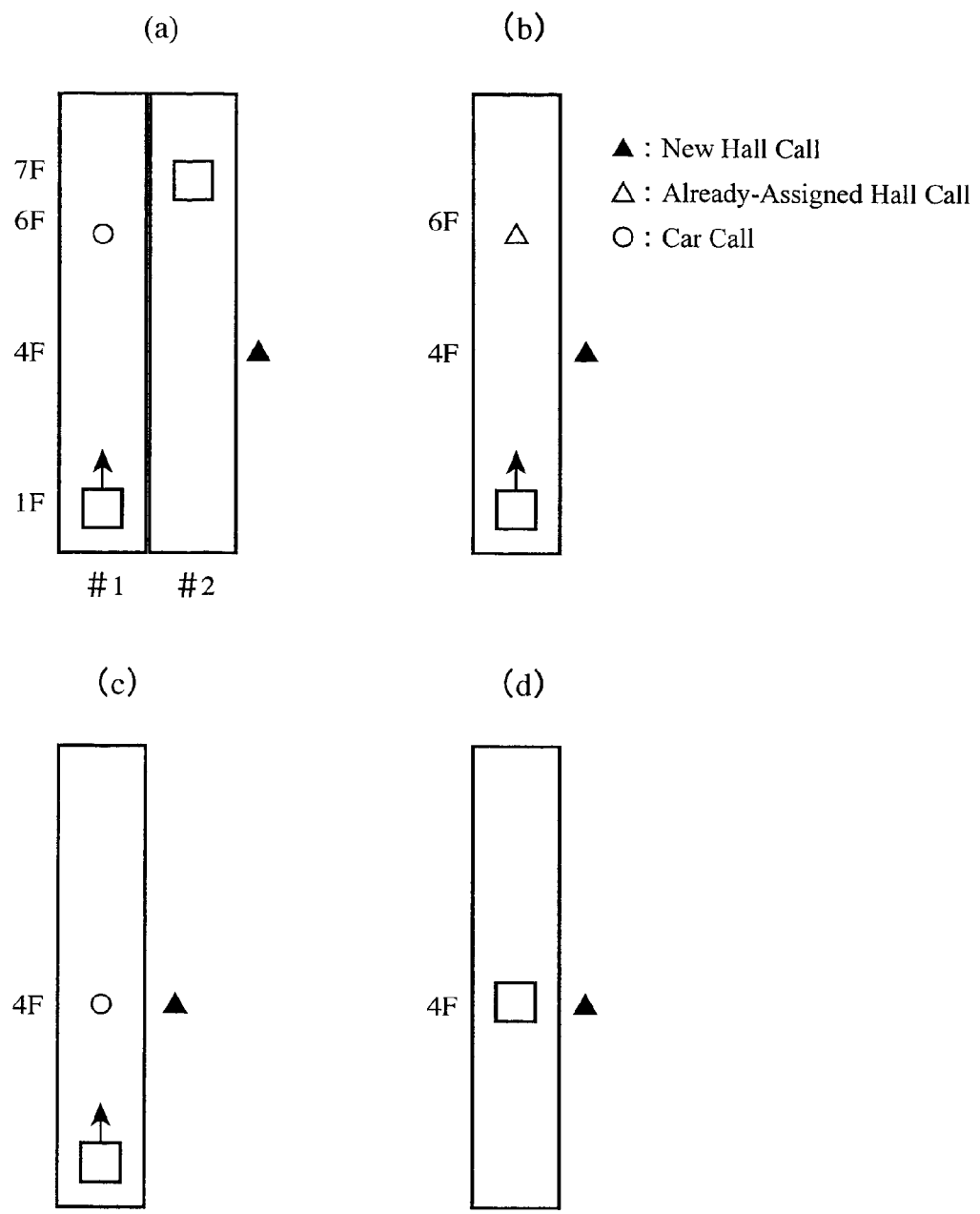
FIG. 12 is an explanatory drawing for explaining a status in which a selection rule for selecting a candidate elevator with the aim of reducing the running distance of each elevator is applied.

FIG. 12 is an explanatory drawing for explaining a status in which the selection rule applied for selecting a candidate elevator is aimed at reduction of the running distance.

In the example of FIG. 12(a), an elevator No. 1 (#1) has a car call at 6F and is just going to start running from 1F, and an elevator No. 2 (#2) is waiting at 7F.

When a hall call of 4F Up occurs in this state, even if this hall call of 4F Up is assigned to any of the elevators No. 1 (#1) and No. 2 (#2), any of them can reach the floor at nearly the same time.

However, the sum total of the running distances of the elevators No. 1 (#1) and No. 2 (#2) becomes shorter in the case in which the hall call is assigned to the elevator No. 1 (#1).

That is, if the new hall call is assigned to either an elevator which is running in the same direction as that associated with a new hall call or an elevator which is scheduled to run in the same direction as that associated with the new hall call, the running distance can be shortened (see FIGS. 12(a) to 12(d)).

Therefore, the selection rule which the candidate elevator selecting unit 22 holds enables assignment of a new hall call to either an elevator which is running in the same direction as that associated with the new hall call or an elevator which is scheduled to run in the same direction as that associated with the new hall call.

For example, the candidate elevator selecting unit holds the following selection rule:

---

IF ((an elevator for which the new hall call causes assignment of self-floor)
or
(an elevator having a hall call at the floor at which the new hall call has occurred)
or
(an elevator which is running or scheduled to run in the same direction as that associated with the new hall call)
THEN
(select the elevator in question as a candidate elevator)

---

In accordance with the above-mentioned selection rule, when the new hall call is assigned to an elevator to which many hall calls are already assigned even if it is moving in the same direction as that associated with the new hall call and has a hall call associated with the forward direction thereof, there can be a case in which a long-time waiting occurs and the transport efficiency of the whole building is dropped.

Therefore, in order to prevent occurrence of a long-time waiting, a condition for selecting an elevator whose number of times that the elevator is scheduled to stop falls within a predetermined number of times is added to each of selection rules which will be shown below (refer to a condition shown after "and").

---
IF ((an elevator for which the new hall call causes assignment of self-floor)
  or
  (an elevator having a hall call at the floor at which the new hall call has occurred)
  or
  (an elevator which is running or scheduled to run in the same direction as that associated with the new hall call)
  and
  (an elevator having only one hall call in the same direction as that associated with the new hall call and in the forward direction thereof)
THEN
  (select the elevator in question as a candidate elevator)
---

As an alternative,

---
IF ((an elevator for which the new hall call causes assignment of self-floor)
  or
  (an elevator having a hall call at the floor at which the new hall call has occurred)
  or
  (an elevator which is running or scheduled to run in the same direction as that associated with the new hall call)
  and
  (an elevator which does not cause any long-time waiting to occur even if the new hall call is assigned thereto)
THEN
  (select the elevator in question as a candidate elevator)
---

As an alternative,

---
IF ((an elevator for which the new hall call causes assignment of self-floor)
  or
  (an elevator having a hall call at the floor at which the new hall call has occurred)
  or
  (an elevator which is running or scheduled to run in the same direction as that associated with the new hall call)
  and
  (an elevator whose control parameter X is equal to or larger than a specified value)
THEN
  (select the elevator in question as a candidate elevator)
---

When the candidate elevator selecting unit 22 uses, for example, the selection rule under the condition that the control parameter X is equal to or larger than a specified value, the candidate elevator selecting unit, as a candidate elevator, selects an elevator whose control parameter X calculated by the parameter calculating unit 21 is equal to or larger than the specified value from among the plurality of elevators. In this embodiment, the case in which the candidate elevator selecting unit uses the selection rule under the condition that the control parameter X is equal to or larger than the specified value is shown. In a case in which the candidate elevator selecting unit uses a selection rule under the condition that the control parameter X is equal to or smaller than a specified value, the candidate elevator selecting unit, as a candidate elevator, selects an elevator whose control parameter X calculated by the parameter calculating unit 21 is equal to or smaller than the specified value from among the plurality of elevators.

When there exists no elevator which satisfies the selection rule, the candidate elevator selecting unit 22 selects all the elevators as candidate elevators. In this case, an elevator to which the hall call is assigned is determined according to the same procedure as a conventional procedure.

When the estimation arithmetic operation unit 12 carries out an estimation arithmetic operation of estimating the running time, the prediction incorrect probability, the crowded probability, and so on of each elevator i for the new hall call, and the candidate elevator selecting unit 22 selects candidate elevators, the evaluation arithmetic operation unit 23 of the elevator group control apparatus 2 derives the evaluated values $E_1(i)$ to $E_3(i)$ of the following items to be evaluated: the running time, the prediction incorrect probability, and the crowded probability of each candidate elevator, from the estimation arithmetic operation results (step ST14).

When the evaluation arithmetic operation unit 14 derives the evaluated values $E_1(i)$ to $E_3(i)$ of the following items to be evaluated: the running time, estimation incorrect probability, and crowded probability, the evaluation arithmetic operation unit multiplies the evaluated values $E_1(i)$ to $E_3(i)$ by weighting factors $w_1$ to $w_3$, respectively, and acquires the sum total of the multiplication results to calculate the total evaluated value J(i) of each candidate elevator (step ST15).

$$J(i)=w_1E_1(i)+w_2E_2(i)+w_3E_3(i) \tag{12}$$

The total evaluated value J(i) of each candidate elevator is equivalent to that given by the equation (1) with the exception that the item to be evaluated about the running distance is omitted.

When the evaluation arithmetic operation unit 14 calculates the total evaluated value J(i) of each candidate elevator i selected by the candidate elevator selecting unit 22, the hall call assignment unit 24 of the elevator group control apparatus 2 selects an elevator whose total evaluated value J(i) is the best (e.g., an elevator whose total evaluated value J(i) is the largest) from among the plurality of candidate elevators. However, in a case in which the equation (12) formed in such a way as to show that the smaller total evaluated value J(i), the better value each elevator has is adopted, the hall call assignment unit selects an elevator whose total evaluated value J(i) is the smallest.

After selecting an elevator whose total evaluated value is the best from among the plurality of candidate elevators selected by the candidate elevator selecting unit 22, the hall call assignment unit 15 carries out a process of assigning the new hall call to the selected elevator (step ST16).

The operation control unit 16 of the elevator group control apparatus 2 notifies the elevator control apparatus 1 associated with the elevator to which the hall call has been assigned by the hall call assignment unit 24 that the hall call has been assigned to the elevator (step ST7).

When receiving the notification of the assignment of the hall call from the elevator group control apparatus 2, the elevator control apparatus 1 controls the elevator to move the elevator to the floor at which the hall call has occurred.

In above-mentioned Embodiment 1, the reduction rate of the total running distance and the improvement rate of the passenger average waiting time with respect to a change in the weighting factor $w_4$ are shown with reference to FIG. 3. The reason why there is a tendency for the amount of reduction of the running distance to increase and hence for the passenger average waiting time to become worse as the weighting factor $w_4$ becomes large is because the priority of the evaluation indicator of the running distance becomes high as the weighting factor $w_4$ becomes large.

The same goes for the control parameter X in this Embodiment 2.

When the specified value which is compared with the control parameter X is set to be, for example, a small value, the number of candidate elevators to which the new hall call can be assigned increases, and there is therefore a high possibility that an elevator with good transport efficiency is selected, a so large amount of reduction of the running distance is not acquired because there is not so much difference between the method of this embodiment and a conventional determining method of determining an elevator to which a new hall call is assigned.

In contrast with this, when the specified value which is compared with the control parameter X is set to be a large value, a large amount of reduction of the running distance can be acquired because the number of candidate elevators decreases, though an elevator whose running distance is short does not necessarily provide a short waiting time, and the transport efficiency may become worse.

Therefore, the intention of the designer of the elevator group control apparatus or user requests can change a judgment of whether to calculate the control parameter X in such a way that a maximum amount of reduction of the running distance can be acquired within the limits of not making the average waiting time become worse at all, to calculate the control parameter X by permitting a certain amount of drop in the transport efficiency in such a way that a larger amount of reduction is obtained in the running distance, or to calculate the control parameter X in such a way that the amount of reduction in the running distance and the improvement rate of the average waiting time can be accepted little by little, and the judgment is dependent on the settings of the equation (11) of the parameter calculating unit 21.

As can be seen from the above description, in accordance with this embodiment 2, the elevator group control apparatus includes the parameter calculating unit 21 for calculating the control parameter X for the selection rule for selecting a candidate elevator to which a hall call can be assigned in consideration of the relation between the running distance of each elevator and the passenger average waiting time, the candidate elevator selecting unit 22 for selecting, as a candidate elevator, an elevator whose control parameter X calculated by the parameter calculating unit 21 satisfies the selection rule from among a plurality of elevators, and the evaluation arithmetic operation unit 23 for calculating the total evaluated value of each candidate elevator, the total evaluated value including, as an item to be evaluated, the running time estimated by the estimation arithmetic operation unit 12, and is so constructed as to select an elevator whose total evaluated value calculated by the evaluation arithmetic operation unit 23 is the best from among the candidate elevators selected by the candidate elevator selecting unit 22, and to assign the hall call to the selected elevator. Therefore, the present embodiment offers an advantage of being able to reduce the running distance of each elevator without causing occurrence of an inconvenient status, such as an increase in the passenger waiting time, thereby enhancing the energy conservation effect.

Embodiment 3

Figure 13:
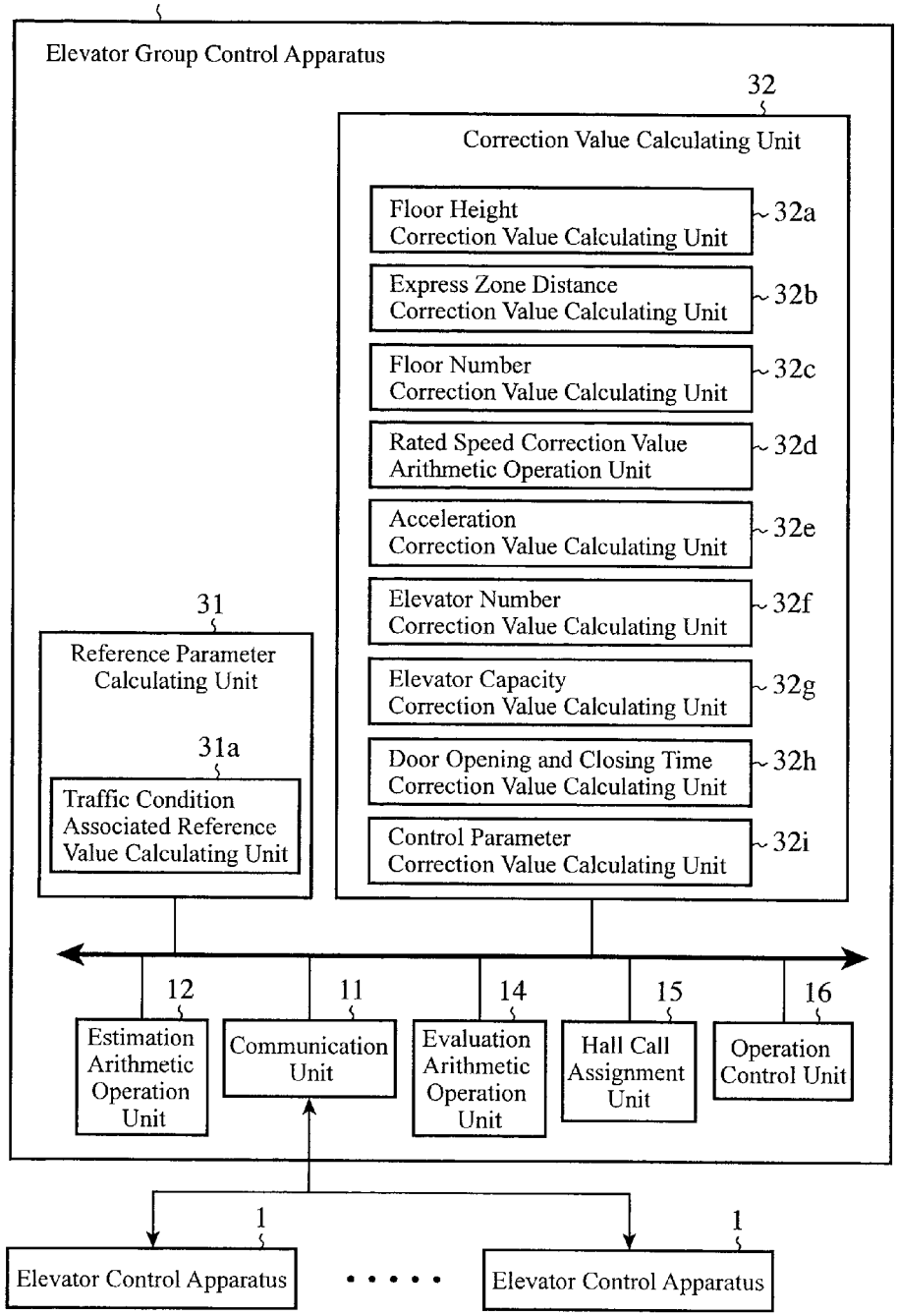
FIG. 13 is the block diagram showing an elevator group control apparatus in accordance with Embodiment 3 of the present invention.

FIG. 13 is a block diagram showing an elevator group control apparatus in accordance with Embodiment 3 of the present invention. In the figure, because the same reference numerals as those shown in FIG. 1 denote the same components or like components, the explanation of these components will be omitted hereafter.

A reference parameter calculating unit 31 includes a traffic condition associated reference value calculating unit 31a therein, and the traffic condition associated reference value calculating unit 31a carries out a process of calculating a reference value $w_{4\_basic}$ of a weighting factor for an item to be evaluated of the running distance of each elevator from a parameter showing the traffic condition.

A correction value calculating unit 32 includes a floor height correction value calculating unit 32a, an express zone distance correction value calculating unit 32b, a floor number correction value calculating unit 32c, a rated speed correction value calculating unit 32d, an acceleration correction value calculating unit 32e, an elevator number correction value calculating unit 32f, an elevator capacity correction value calculating unit 32g, a door opening and closing time correction value calculating unit 32h, and a control parameter correction value calculating unit 32i therein, and carries out a process of correcting the reference value $w_{4\_basic}$ of the weighting factor which is calculated by the reference parameter calculating unit 31 according to parameters showing the elevator specifications, the building specifications, and the elevator control state.

A weighting factor determining means is comprised of the reference parameter calculating unit 31 and the correction value calculating unit 32.

In the example of FIG. 13, it is assumed that a communication unit 11, an estimation arithmetic operation unit 12, an evaluation arithmetic operation unit 14, a hall call assignment unit 15, an operation control unit 16, the reference parameter calculating unit 31, and the correction value calculating unit 32 which are the components of the elevator group control apparatus 2 consist of a piece of hardware for exclusive use (e.g., a semiconductor integrated circuit substrate on which an MPU and so on are mounted). In a case in which the elevator group control apparatus 2 consists of a computer, a program in which the descriptions of the processes of the communication unit 11, the estimation arithmetic operation unit 12, the evaluation arithmetic operation unit 14, the hall call assignment unit 15, the operation control unit 16, the reference parameter calculating unit 31, and the correction value calculating unit 32 are described can be stored in a memory of the computer, and the CPU of the computer can execute the program stored in the memory.

Figure 14:
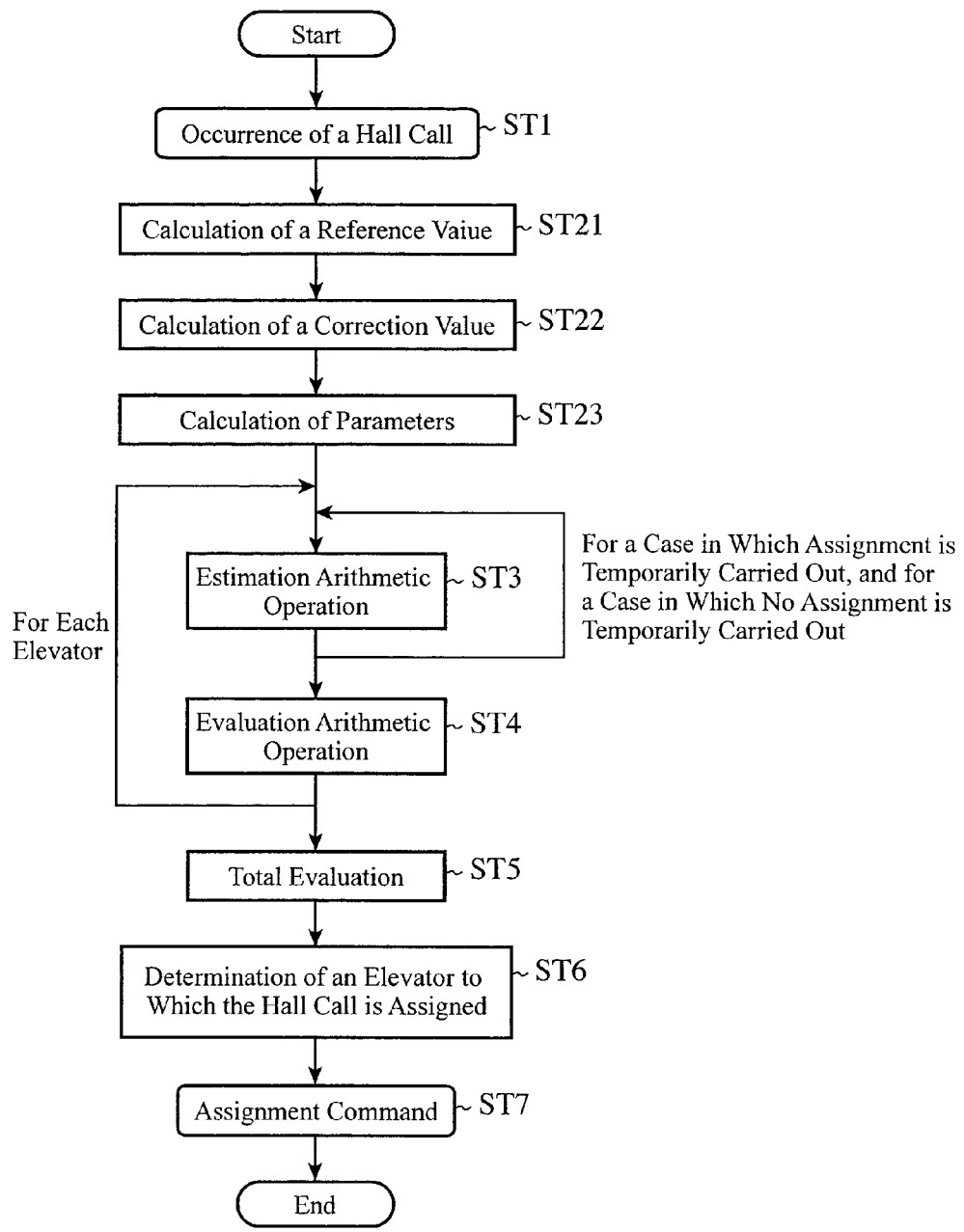
FIG. 14 is a flow chart showing the description of processing carried out by the elevator group control apparatus in accordance with Embodiment 3 of the present invention.

FIG. 14 is a flow chart showing the description of processing carried out by the elevator group control apparatus in accordance with Embodiment 3 of the present invention.

Next, the operation of the elevator group control apparatus will be explained.

An appropriate value of one control parameter disposed within the elevator group control apparatus is affected by many elements (e.g., the floor height, the express zone distance, the number of floors, the rated speed, the acceleration, the number of elevators, the elevator capacity, the door opening and closing time, and a control parameter N). Therefore, a function having, as parameters, all the elements is a complicated one in which many elements affect one another.

Therefore, JP,59-82279,A, which is a patent reference, uses a method of changing a control parameter to be acquired and carrying out a simulation evaluation at regular intervals so as to determine a control parameter suitable for the operation control of a currently-used elevator group control apparatus by using a curve showing acquired capability and a desired value.

However, the use of the above-mentioned method requires installation of a piece of simulation software, in addition to a piece of operation control software used for control of elevators, into the elevator group control apparatus in order to acquire a suitable control parameter, and, taken all together, this results in complexity of a mechanism for determining the parameter.

Because a simulation evaluation is carried out at regular intervals in such a way that the parameter is determined, not only elements required for initial settings of the simulation but also a degree of simulation accuracy, a method of statistically processing output results, and so on serve as elements which contribute to the determination of the parameter. It is therefore difficult to presume a state in which the control parameter to be acquired deviates from an expected value, and, if it becomes clear that the calculated control parameter deviates from the expected value, it is difficult to diagnose the cause of this problem.

Furthermore, it is assumed that the function f of the equation (2) for calculating the control parameter, which is shown in above-mentioned Embodiment 1, is determined on the basis of the relation between the parameters P, Q, R, S, and C, which were experimentally acquired through a prior simulation experiment or the like, and the weighting factor $w_4$.

However, as shown in FIGS. 4 and 5, the function f is not necessarily determined from a graph showing a monotonous change, and it can be expected that this function is a complicated one in which elements affect one another.

Because it is difficult to presume a state in which the control parameter to be acquired deviates from an expected value, and, if it becomes clear that the calculated control parameter deviates from the expected value, it is difficult to diagnose the cause of this problem, an improvement is required in the determining method of determining the control parameter.

Hereafter, in this Embodiment 3, the determining method of determining the control parameter will be explained in detail.

For example, when a passenger pushes a hall call button installed in a boarding area for the elevators to cause a new hall call to occur (step ST1), the communication unit 11 of the elevator group control apparatus 2 acquires running information, such as the current position of each elevator i, the floor at which the hall call has occurred, the direction of the hall call, the running direction (the upward or downlink direction), the destination floor, and so on from the elevator control apparatus 1 of each elevator i, like that of above-mentioned Embodiment 1.

The reference parameter calculating unit 31 of the elevator group control apparatus 2 calculates the reference value $w_{4\_basic}$ of the weighting factor for the evaluated value $E_4(i)$ of the running distance (step ST21).

The reference value $w_{4\_basic}$ of the weighting factor is determined by using a reference function $f_{basic}$ corresponding to a variation of a specific element in a state (a reference environment) in which values other than the specific element, among the elements (the traffic, the traffic pattern, the floor height, the express zone distance, the floor number, the rated speed, the acceleration, the number of elevator, the elevator capacity, the door opening and closing time, and the control parameter N) which determine the weighting factor $w_4$, are fixed.

For example, in a case in which elevators which meet specific elevator specifications (car specifications) are installed in a specific building and are made to start operating once, there is few case in which the floor height, the express zone distance, the number of floors, the rated speed, the acceleration, the number of the elevators, the elevator capacity, the door opening and closing time, and so on vary whenever necessary.

On the other hand, the traffic and the traffic pattern are elements which can vary at any time even after the elevators are made to start operating.

Therefore, in this Embodiment 3, the traffic condition associated reference value calculating unit 31*a* of the reference parameter calculating unit 31, in the reference environment in which the values showing the building specifications, the elevator specifications, and so on, such as the floor height, the express zone distance, the number of floors, the rated speed, the acceleration, the number of elevators, the elevator capacity, the door opening and closing time, and the control parameter N, are fixed, pays attention to only variations in the traffic conditions, such as the traffic and the traffic pattern, and calculates the reference value $w_{4\_basic}$ of the weighting factor by using the following equation (13):

$$w_{4\_basic}=f_{basic}(P,Q) \qquad (13)$$

The reference function $f_{basic}$ is determined on the basis of a relation between the parameters P and Q, which were experimentally acquired through a prior simulation experiment or the like, and the reference value $w_{4\_basic}$.

For example, assuming that, as a result of carrying out a simulation experiment on the conditions of specific elevator specifications, a specific building shape, and a specific control parameter N (in a reference environment), the value (value) of the reference value $w_{4\_basic}$ of the weighting factor which provides the largest amount of reduction of the running distance changes, as shown in FIG. 4 or 5, with change in either element of the variables (P and Q), within the limits of not making the average waiting time become worse, $f_{basic}$ in the equation (13) can be determined according to the same procedure as that of determining the function f in the equation (2) of above-mentioned Embodiment 1.

In above-mentioned Embodiment 1, the explanation is made by assuming that the value of the weighting factor $w_4$ which provides the largest amount of reduction of the running distance changes, as shown in FIG. 4 or 5, with change in the variables (P, Q, R, S, and C) within the limits of not making the average waiting time become worse, though because there are many elements included in the variables (P, Q, R, S, and C), the elements affect one another and the weighting factor does not show a monotonous change as shown in FIG. 4 or 5.

The more complicated the change becomes, the more complicated the regression equation becomes. In contrast with this, the weighting factor $w_4$ can have an appropriate value which shows a monotonous change more easily with decrease in the number of elements included in the variables. The provision of a monotonous change in the appropriate value of the weighting factor makes it easy to acquire a simple regression equation.

This embodiment is explained above by assuming that the elevator group control apparatus is aimed at carrying out operation control in such a way as to provide the largest amount of reduction in the running distance within the limits of not making the average waiting time become worse.

However, like in the case in which the equation (2) is set up in above-mentioned Embodiment 1, it is clear by observing the graph of FIG. 3 that the aim of the designer of the elevator group control apparatus or user requests can change a judgment of whether to carry out operation control in such a way as to provide the largest amount of reduction in the running distance within the limits of not making the average waiting time become worse at all, or to carry out operation control by either permitting a certain amount of drop in the transport efficiency and then setting the weighting factor $w_4$ to be a larger value than "17" in such a way that a larger amount of reduction is obtained in the running distance, or setting the weighting factor $w_4$ to be a smaller value than "17" in such a way that the amount of reduction in the running distance and the improvement rate of the average waiting time can be accepted little by little.

Not only the judgment about the waiting time but a judgment of which the prediction incorrect probability or the crowded probability of the equation (1), or the amount of reduction in the running distance is given a higher priority to what extent can be changed by the aim of the designer of the elevator group control apparatus or user requests. Because the appropriate value of the weighting factor $w_4$ differs dependently upon the judgment, in what type of form the equation (13) is provided by using P and Q depends upon the judgment.

The correction value calculating unit 32 calculates a correction value Cu for correcting the difference between the reference value $w_{4\_basic}$ and the appropriate value which is caused by the difference between the determined reference environment and the actual environment (step ST22).

Elements used for the calculation of the correction value Cu include the floor height, the express zone distance, the number of floors, the rated speed and acceleration of each elevator, the elevator capacity, the door opening and closing time, and the control parameter N.

By using these elements, the correction value Cu is calculated according to a specific function cf given b the following equation (15):

$$Cu = cf(\text{the floor height, the express zone distance, the number of floors, the rated speed, the acceleration, the elevator capacity, the number of elevators, the door opening and closing time, and the control parameter } N) \quad (15)$$

The function cf is determined on the basis of a relation between the floor height, the express zone distance, the number of floors, the rated speed, the acceleration, the elevator capacity, the number of elevators, the door opening and closing time, the control parameter N, and so on which were experimentally acquired through a prior simulation experiment or the like, and the correction value Cu.

Hereafter, a procedure for determining the equation (15) will be explained.

For example, assuming that the correction value Cu to be determined is used as a correction coefficient, and the reference value $w_{4\_basic}$ given by the equation (13) is multiplied by the correction value, the weighting factor $w_4$ is shown as follows:

$$w_4 = w_{4\_basic} \times Cu$$

Assuming that the appropriate value of the weighting factor $w_4$ is estimated through a prior experiment, the following equation: $Cu = w_4/w_{4\_basic}$ must be satisfied if $w_4 = w_{4\_basic} \times Cu$.

An appropriate $Cu = w_4/w_{4\_basic}$ is estimated from the estimated weighting factor $w_4$ and the reference value $w_{4\_basic}$ which is calculated according to the equation (13).

Assuming that the estimated appropriate $Cu = w_4/w_{4\_basic}$ (value) shows a change, as shown in FIG. 4 or 5, for either element of the variables (the floor height, the express zone distance, the number of floors, the rated speed, the acceleration, the elevator capacity, the number of elevators, the door opening and closing time, and the control parameter N), the function cf in the equation (15) can be determined according to the same procedure as that for determining the function f in the equation (2) of above-mentioned Embodiment 1.

In the procedure of determining the equation (15), it is not necessary to estimate the appropriate value of the weighting factor $w_4$ on all the conditions through a prior experiment.

However, it can be expected that the function cf showing the relation between the correction value Cu and all the elements rarely exhibits a monotonous change as shown in FIG. 4 or 5, and becomes complicated.

The fewer elements are included in the function, the more monotonous change the correction value Cu has and therefore the simpler the function is.

Therefore, instead of the correction value corresponding to all the elements, a correction value according to the building specifications, such as the floor height, the number of floors, and the express zone distance, a correction value according to elevator specifications, such as the rated speed, the acceleration, the elevator capacity, the number of elevators, and the door opening and closing time, and a correction value according to the control parameter N are calculated individually.

For example, by using the floor height, the number of floors, the express zone distance, and so on, the correction value $C_S$ according to the building specifications is derived according to a specific function cq shown in the following equation (16):

$$C_S = cq(\text{the floor height, the number of floors, the express zone distance}) \quad (16)$$

The function cq is determined on the basis of a relation between the floor height, the number of floors, the express zone distance, and so on which were experimentally acquired through a prior simulation experiment or the like, and the correction value $C_S$.

Hereafter, a procedure for determining the equation (16) will be explained.

For example, assuming that the correction value $C_S$ to be determined is used as a correction coefficient, and the reference value $w_{4\_basic}$ in the equation (13) is multiplied by the correction value, the weighting factor $w_4$ is shown as follows:

$$w_4 = w_{4\_basic} \times C_S$$

Assuming that the appropriate value of the weighting factor $w_4$ is estimated through a prior experiment, the following equation: $C_S = w_4/w_{4\_basic}$ must be satisfied if $w_4 = w_{4\_basic} \times C_S$.

An appropriate $C_S = w_4/w_{4\_basic}$ can be estimated from the estimated weighting factor $w_4$ and the reference value $w_{4\_basic}$ which is calculated according to the equation (13).

Assuming that the estimated appropriate $C_S = w_4/w_{4\_basic}$ (value) shows a change, as shown in FIG. 4 or 5, for either element of the variables (the floor height, the express zone distance, and the number of floors), the function cq in the equation (16) can be determined according to the same procedure as that for determining the function f in the equation (2) of above-mentioned Embodiment 1.

For example, by using the rated speed, the acceleration, the number of elevators, the elevator capacity, the door opening and closing time, and so on, the correction value $C_P$ according to the elevator specifications is derived according to a specific function cp shown in the following equation (17):

$$C_P = cp(\text{the rated speed, acceleration, the elevator capacity, the number of elevators, the door opening and closing time}) \quad (17)$$

The function cp is determined on the basis of a relation between the rated speed, the acceleration, the elevator capacity, the number of elevators, the door opening and closing time, and so on which were experimentally acquired through a prior simulation experiment or the like, and the correction value $C_P$.

Hereafter, a procedure for determining the equation (17) will be explained.

For example, assuming that the correction value $C_P$ to be determined is used as a correction coefficient, and the reference value $w_{4\_basic}$ in the equation (13) is multiplied by the correction value, the weighting factor $w_4$ is shown as follows:

$$w_4 = w_{4\_basic} \times C_P$$

Assuming that the appropriate value of the weighting factor $w_4$ is estimated through a prior experiment, the following equation: $C_P = w_4/w_{4\_basic}$ must be satisfied if $w_4 = w_{4\_basic} \times C_P$.

An appropriate $C_P = w_4/w_{4\_basic}$ can be estimated from the estimated weighting factor $w_4$ and the reference value $w_{4\_basic}$ which is calculated according to the equation (13).

Assuming that the estimated appropriate $C_P = w_4/w_{4\_basic}$ (value) shows a change, as shown in FIG. 4 or 5, for either element of the variables (the rated speed, the acceleration, the elevator capacity, the number of elevators, and the door opening and closing time), the function cp in the equation (17) can be determined according to the same procedure as that for determining the function f in the equation (2) of above-mentioned Embodiment 1.

For example, by using the control parameter N, the correction value $C_C$ according to the control parameter N is derived according to a specific function cc shown in the following equation (18):

$$C_C = cc(\text{the control parameter } N) \quad (18)$$

The function cc is determined on the basis of a relation between the control parameter N which was experimentally acquired through a prior simulation experiment, and the correction value $C_C$. The control parameter N is the same as the control parameter N explained in above-mentioned Embodiment 1.

Hereafter, a procedure for determining the equation (18) will be explained.

For example, assuming that the correction value $C_C$ to be determined is used as a correction coefficient, and the reference value $w_{4\_basic}$ in the equation (13) is multiplied by the correction value, the weighting factor $w_4$ is shown as follows:

$$w_4 = w_{4\_basic} \times C_C$$

Assuming that the appropriate value of the weighting factor $w_4$ is estimated through a prior experiment, the following equation: $C_C = w_4/w_{4\_basic}$ must be satisfied if $w_4 = w_{4\_basic} \times C_C$.

An appropriate $C_C = w_4/w_{4\_basic}$ can be estimated from the estimated weighting factor $w_4$ and the reference value $w_{4\_basic}$ which is calculated according to the equation (13).

Assuming that the estimated appropriate $C_C = w_4/w_{4\_basic}$ (value) shows a change, as shown in FIG. 4 or 5, for either element of the variables (the control parameter N_1, the control parameter N_2, ..., and the control parameter N_N), the function cc in the equation (18) can be determined according to the same procedure as that for determining the function f in the equation (2) of above-mentioned Embodiment 1.

In a case in which a value for correcting the weighting factor reference value $w_{4\_basic}$ in order to calculate a final weighting factor $w_4$ is expressed as $C_{final}$, an equation showing a relation between $C_S$, $C_P$ and $C_C$ which are calculated individually according to the equations (16), (17), and (18), and $C_{final}$ is needed.

$$C_{final} = f_{final}(C_S, C_P, C_C) \quad (19)$$

The function $f_{final}$ is determined on the basis of a relation between $C_S$, $C_P$, $C_C$, and so on which were experimentally acquired through a prior simulation experiment or the like, and $C_{final}$.

For example, assuming that the correction value $C_{final}$ is used as a correction coefficient, and the reference value $w_{4\_basic}$ in the equation (13) is multiplied by the correction value, the weighting factor $w_4$ is shown as follows:

$$w_4 = w_{4\_basic} \times C_{final}$$

Assuming that the appropriate value of the weighting factor $w_4$ is estimated through a prior experiment, the following equation: $C_{final} = w_4/w_{4\_basic}$ must be satisfied if $w_4 = w_{4\_basic} \times C_S$.

An appropriate $C_{final} = w_4/w_{4\_basic}$ can be estimated from the estimated weighting factor $w_4$ and the reference value $w_{4\_basic}$ which is calculated according to the equation (13).

Assuming that the estimated appropriate $C_{final} = w_4/w_{4\_basic}$ (value) shows a change, as shown in FIG. 4 or 5, for either element of the variables ($C_S$, $C_P$, and $C_C$), the function $f_{final}$ in the equation (19) can be determined according to the same procedure as that for determining the function f in the equation (2) of above-mentioned Embodiment 1.

As the function $f_{final}$ shown by the equation (19), there is, for example, the following equation (20):

$$C_{final} = C_S \times C_P \times C_C \quad (20)$$

In the case of using this equation (20), even if increase in the floor height, the number of floors, or the express zone distance causes the running distance to be twice compared with that according to the building specifications which are defined as the reference environment, and therefore the evaluated value $E_4(i)$ of the running distance in the equation (1) becomes twice, the evaluated value $E_4(i)$ of the running distance is not regarded as important too much because the weighting factor $w_4$ is reduced to the half because of either one of the correction values $C_S$, $C_P$, and $C_C$. The equation (20) is an example of the equation (19).

In the case of using either of the equations (16), (17), and (18), all the elements are divided roughly into the following three categories: the building specifications, the elevator specifications, and the control parameter N, and the correction value is calculated for each and every category. However, the number of categories is not limited to three. Furthermore, the method of classifying all the elements into some categories is not limited to the above-mentioned exemplary method.

In accordance with the above-mentioned method, while the correction value is calculated for each and every category, the fewer elements are included in the function the simpler the function is. By therefore calculating a correction value for each and every element, the function becomes simpler.

To this end, the floor height correction value calculating unit 32*a* of the correction value calculating unit 32 calculates the following correction value $C_1$ according to the floor height of the building.

$$C_1 = f_1(\text{the floor height}) \quad (21)$$

The function $f_1$ is determined on the basis of a relation between the floor height which was experimentally acquired through a prior simulation experiment or the like, and the correction value $C_1$.

For example, assuming that the correction value $C_1$ is used as a correction coefficient, and the reference value $w_{4\_basic}$ in the equation (13) is multiplied by the correction value, the weighting factor $w_4$ is shown as follows:

$$w_4 = w_{4\_basic} \times C_1$$

Assuming that the appropriate value of the weighting factor $w_4$ is estimated through a prior experiment, the following equation: $C_1=w_4/w_{4\_basic}$ must be satisfied if $w_4=w_{4\_basic} \times C_1$.

An appropriate $C_1=w_4/w_{4\_basic}$ can be estimated from the estimated weighting factor $w_4$ and the reference value $w_{4\_basic}$ which is calculated according to the equation (13).

Assuming that the estimated appropriate $C_1=w_4/w_{4\_basic}$ (value) shows a change, as shown in FIG. 4 or 5, for the variable (the floor height), the function $f_1$ in the equation (21) can be determined according to the same procedure as that for determining the function f in the equation (2) of above-mentioned Embodiment 1.

As the floor height increases, the running distance of each elevator becomes long in proportion to this increase. When the running distance becomes long, the running distance evaluated value becomes large. However, because the stop time of each elevator, and so on are included in the passenger waiting time, even if the floor height is doubled, the waiting time is not necessarily doubled in proportion to this increase of the floor height. Therefore, by taking into consideration the relation between the running distance evaluated value and the waiting time evaluated value, the calculated weighting factor for the running distance evaluated value has to have a smaller value with increase in the floor height.

Therefore, for example, the correction coefficient of the weighting factor according to the floor height is calculated as follows:

$$C_1=\text{(a reference floor height)/(the floor height)} \quad (22)$$

The reference floor height is the floor height of a building which is the reference environment. When the weighting factor reference value is multiplied by the correction coefficient of the equation (22), the calculated weighting factor has a smaller value as the floor height increases compared with the reference floor height. Although it is assumed that the running distance evaluated value becomes large as the running distance becomes long, in a case in which the running distance evaluated value is calculated in such a way that as the running distance becomes large, the running distance evaluated value becomes small, the calculated weighting factor for the running distance evaluated value has to have a larger value with increase in the floor height.

In this case, for example, the inverse of the value given by the equation (22) can be defined as the correction coefficient $C_1$. The correction coefficient of the equation (22) is an example of the correction value according to the floor height shown by the equation (21).

According to the express zone distance of the building, the express zone distance correction value calculating unit 32*b* of the correction value calculating unit 32 calculates the following correction value $C_2$:

$$C_2=f_2(\text{the express zone distance}) \quad (23)$$

The function $f_2$ is determined on the basis of a relation between the express zone distance which was experimentally acquired through a prior simulation experiment or the like, and the correction value $C_2$.

For example, assuming that the correction value $C_2$ is used as a correction coefficient, and the reference value $w_{4\_basic}$ in the equation (13) is multiplied by the correction value, the weighting factor $w_4$ is shown as follows:

$$w_4=w_{4\_basic} \times C_2$$

Assuming that the appropriate value of the weighting factor $w_4$ is estimated through a prior experiment, the following equation: $C_2=w_4/w_{4\_basic}$ must be satisfied if $w_4=w_{4\_basic} \times C_2$.

An appropriate $C_2=w_4/w_{4\_basic}$ can be estimated from the estimated weighting factor $w_4$ and the reference value $w_{4\_basic}$ which is calculated according to the equation (13).

Assuming that the estimated appropriate $C_2=w_4/w_{4\_basic}$ (value) shows a change, as shown in FIG. 4 or 5, for the variable (the express zone distance), the function $f_2$ in the equation (23) can be determined according to the same procedure as that for determining the function f in the equation (2) of above-mentioned Embodiment 1.

As the express zone distance becomes long, the running distance of each elevator becomes long in proportion to this increase. When the running distance becomes long, the running distance evaluated value becomes large. However, because the stop time of each elevator, and so on are included in the passenger waiting time, even if the express zone distance is doubled, the waiting time is not necessarily doubled in proportion to this increase of the express zone distance. Therefore, by taking into consideration the relation between the running distance evaluated value and the waiting time evaluated value, the calculated weighting factor for the running distance evaluated value has to have a smaller value with increase in the express zone distance.

Therefore, for example, the correction coefficient of the weighting factor according to the express zone distance is calculated as follows:

$$C_2=\text{(the running distance excluding the express zone+a reference express zone distance)/(the running distance excluding the express zone+the express zone distance)} \quad (24)$$

The reference express zone distance is the express zone distance of a building which is the reference environment. When the weighting factor reference value is multiplied by the correction coefficient of the equation (24), the calculated weighting factor has a smaller value as the express zone distance increases compared with the reference express zone distance. Although it is assumed that the running distance evaluated value becomes large as the running distance becomes long, in a case in which the running distance evaluated value is calculated in such away that as the running distance becomes large, the running distance evaluated value becomes small, the calculated weighting factor for the running distance evaluated value has to have a larger value with increase in the express zone distance.

In this case, for example, the inverse of the value given by the equation (24) can be defined as the correction coefficient $C_2$. The correction coefficient of the equation (24) is an example of the correction value according to the express zone distance shown by the equation (23).

According to the number of floors of the building, the floor number correction value calculating unit 32*c* of the correction value calculating unit 32 calculates the following correction value $C_3$:

$$C_3=f_3(\text{the number of floors}) \quad (25)$$

The function $f_3$ is determined on the basis of a relation between the number of floors which was experimentally acquired through a prior simulation experiment or the like, and the correction value $C_2$.

For example, assuming that the correction value $C_3$ is used as a correction coefficient, and the reference value $w_{4\_basic}$ in the equation (13) is multiplied by the correction value, the weighting factor $w_4$ is shown as follows:

$$w_4=w_{4\_basic} \times C_3$$

Assuming that the appropriate value of the weighting factor $w_4$ is estimated through a prior experiment, the following equation: $C_3=w_4/w_{4\_basic}$ must be satisfied if $w_4=w_{4\_basic}\times C_3$.

An appropriate $C_3=w_4/w_{4\_basic}$ can be estimated from the estimated weighting factor $w_4$ and the reference value $w_{4\_basic}$ which is calculated according to the equation (13).

Assuming that the estimated appropriate $C_3=w_4/w_{4\_basic}$ (value) shows a change, as shown in FIG. 4 or 5, for the variable (the number of floors), the function $f_3$ in the equation (25) can be determined according to the same procedure as that for determining the function f in the equation (2) of above-mentioned Embodiment 1.

As the number of floors becomes large, the running distance of each elevator becomes long in proportion to this increase. When the running distance becomes long, the running distance evaluated value becomes large. However, because the stop time of each elevator, and so on are included in the passenger waiting time, even if the number of floors is doubled, the waiting time is not necessarily doubled in proportion to this increase of the number of floors. Therefore, by taking into consideration the relation between the running distance evaluated value and the waiting time evaluated value, the calculated weighting factor for the running distance evaluated value has to have a smaller value with increase in the number of floors.

Therefore, for example, the correction coefficient of the weighting factor according to the number of floors is calculated as follows:

$$C_3=\text{a reference number of floors/the number of floors} \qquad (26)$$

The reference number of floors is the number of floors of a building which is the reference environment. When the weighting factor reference value is multiplied by the correction coefficient of the equation (26), the calculated weighting factor has a smaller value as the number of floors increases compared with the reference number of floors. Although it is assumed that the running distance evaluated value becomes large as the running distance becomes long, in a case in which the running distance evaluated value is calculated in such a way that as the running distance becomes large, the running distance evaluated value becomes small, the calculated weighting factor for the running distance evaluated value has to have a larger value with increase in the number of floors.

In this case, for example, the inverse of the value given by the equation (26) can be defined as the correction coefficient $C_3$. The correction coefficient of the equation (26) is an example of the correction value according to the number of floors shown by the equation (25).

According to the rated speed, the rated speed correction value calculating unit 32d of the correction value calculating unit 32 calculates the following correction value $C_4$:

$$C_4=f_4(\text{the rated speed}) \qquad (27)$$

The function $f_4$ is determined on the basis of the relation between the rated speed which was experimentally acquired through a prior simulation experiment or the like, and the correction value $C_4$.

For example, assuming that the correction value $C_4$ is used as a correction coefficient, and the reference value $w_{4\_basic}$ in the equation (13) is multiplied by the correction value, the weighting factor $w_4$ is shown as follows:

$$w_4=w_{4\_basic}\times C_4$$

Assuming that the appropriate value of the weighting factor $w_4$ is estimated through a prior experiment, the following equation: $C_4=w_4/w_{4\_basic}$ must be satisfied if $w_4=w_{4\_basic}\times C_4$.

An appropriate $C_4=w_4/w_{4\_basic}$ can be estimated from the estimated weighting factor $w_4$ and the reference value $w_{4\_basic}$ which is calculated according to the equation (13).

Assuming that the estimated appropriate $C_4=w_4/w_{4\_basic}$ (value) shows a change, as shown in FIG. 4 or 5, for the variable (the rated speed), the function $f_4$ in the equation (27) can be determined according to the same procedure as that for determining the function f in the equation (2) of above-mentioned Embodiment 1.

According to the acceleration, the acceleration correction value calculating unit 32e of the correction value calculating unit 32 calculates the following correction value $C_5$:

$$C_5=f_5(\text{the acceleration}) \qquad (28)$$

The function $f_5$ is determined on the basis of a relation between the acceleration which was experimentally acquired through a prior simulation experiment or the like, and the correction value $C_5$.

For example, assuming that the correction value $C_5$ is used as a correction coefficient, and the reference value $w_{4\_basic}$ in the equation (13) is multiplied by the correction value, the weighting factor $w_4$ is shown as follows:

$$w_4=w_{4\_basic}\times C_5$$

Assuming that the appropriate value of the weighting factor $w_4$ is estimated through a prior experiment, the following equation: $C_5=w_4/w_{4\_basic}$ must be satisfied if $w_4=w_{4\_basic}\times C_5$.

An appropriate $C_5=w_4/w_{4\_basic}$ can be estimated from the estimated weighting factor $w_4$ and the reference value $w_{4\_basic}$ which is calculated according to the equation (13).

Assuming that the estimated appropriate $C_5\ w_4/w_{4\_basic}$ (value) shows a change, as shown in FIG. 4 or 5, for the variable (the acceleration), the function $f_5$ in the equation (28) can be determined according to the same procedure as that for determining the function f in the equation (2) of above-mentioned Embodiment 1.

According to the number of elevators, the elevator number correction value calculating unit 32f of the correction value calculating unit 32 calculates the following correction value $C_6$:

$$C_6=f_6(\text{the number of elevators}) \qquad (29)$$

The function $f_6$ is determined on the basis of a relation between the number of elevators which was experimentally acquired through a prior simulation experiment or the like, and the correction value $C_6$.

For example, assuming that the correction value $C_6$ is used as a correction coefficient, and the reference value $w_{4\_basic}$ in the equation (13) is multiplied by the correction value, the weighting factor $w_4$ is shown as follows:

$$w_4=w_{4\_basic}\times C_6$$

Assuming that the appropriate value of the weighting factor $w_4$ is estimated through a prior experiment, the following equation: $C_6=w_4/w_{4\_basic}$ must be satisfied if $w_4=w_{4\_basic}\times C_6$.

An appropriate $C_6=w_4/w_{4\_basic}$ can be estimated from the estimated weighting factor $w_4$ and the reference value $w_{4\_basic}$ which is calculated according to the equation (13).

Assuming that the estimated appropriate $C_6=w_4/w_{4\_basic}$ (value) shows a change, as shown in FIG. 4 or 5, for the variable (the number of elevators), the function $f_6$ in the equation (29) can be determined according to the same procedure as that for determining the function f in the equation (2) of above-mentioned Embodiment 1.

As the number of elevators becomes large, the passenger waiting time decreases even though the plurality of elevators have the same number of passengers and the same traffic pattern. However, the running distance of each elevator does not change. Therefore, by taking into consideration the relation between the running distance evaluated value and the waiting time evaluated value, the calculated weighting factor for the running distance evaluated value has to have a smaller value with increase in the number of elevators.

To this end, for example, the correction coefficient of the weighting factor according to the number of elevators is calculated as follows:

$$C_6 = r^{(M-a\ reference\ number\ of\ cars)} \tag{30}$$

where r shows a degree of relativity (equal to or larger than 0 and equal to or smaller than 1). When the weighting factor reference value is multiplied by the correction coefficient of the equation (30), the calculated weighting factor has a smaller value as the number of elevators increases. The correction coefficient of the equation (30) is an example of the correction value according to the number of elevators shown by the equation (29).

According to the elevator capacity, the elevator capacity correction value calculating unit 32g of the correction value calculating unit 32 calculates the following correction value $$C_7 = f_7(\text{the elevator capacity}) \tag{31}$$

The function $f_7$ is determined on the basis of a relation between the elevator capacity which was experimentally acquired through a prior simulation experiment or the like, and the correction value $C_7$.

For example, assuming that the correction value $C_7$ is used as a correction coefficient, and the reference value $w_{4\_basic}$ in the equation (13) is multiplied by the correction value, the weighting factor $w_4$ is shown as follows:

$$w_4 = w_{4\_basic} \times C_7$$

Assuming that the appropriate value of the weighting factor $w_4$ is estimated through a prior experiment, the following equation: $C_7 = w_4/w_{4\_basic}$ must be satisfied if $w_4 = w_{4\_basic} \times C_7$.

An appropriate $C_7 = w_4/w_{4\_basic}$ can be estimated from the estimated weighting factor $w_4$ and the reference value $w_{4\_basic}$ which is calculated according to the equation (13).

Assuming that the estimated appropriate $C_7 = w_4/w_{4\_basic}$ (value) shows a change, as shown in FIG. 4 or 5, for the variable (the elevator capacity), the function $f_7$ in the equation (31) can be determined according to the same procedure as that for determining the function f in the equation (2) of above-mentioned Embodiment 1.

According to the door opening and closing time, the door opening and closing time correction value calculating unit 32h of the correction value calculating unit 32 calculates the following correction value $C_8$:

$$C_8 = f_8(\text{the door opening and closing time}) \tag{32}$$

The function $f_8$ is determined on the basis of a relation between the door opening and closing time which was experimentally acquired through a prior simulation experiment or the like, and the correction value $C_8$.

For example, assuming that the correction value $C_8$ is used as a correction coefficient, and the reference value $w_{4\_basic}$ in the equation (13) is multiplied by the correction value, the weighting factor $w_4$ is shown as follows:

$$w_4 = w_{4\_basic} \times C_8$$

Assuming that the appropriate value of the weighting factor $w_4$ is estimated through a prior experiment, the following equation: $C_8 = w_4/w_{4\_basic}$ must be satisfied if $w_4 = w_{4\_basic} \times C_8$.

An appropriate $C_8 = w_4/w_{4\_basic}$ can be estimated from the estimated weighting factor $w_4$ and the reference value $w_{4\_basic}$ which is calculated according to the equation (13).

Assuming that the estimated appropriate $C_8 = w_4/w_{4\_basic}$ (value) shows a change, as shown in FIG. 4 or 5, for the variable (the door opening and closing time), the function $f_8$ in the equation (32) can be determined according to the same procedure as that for determining the function f in the equation (2) of above-mentioned Embodiment 1.

According to the control parameter N, the control parameter correction value calculating unit 32i of the correction value calculating unit 32 calculates the following correction value $C_9$:

$$C_9 = f_9(\text{the control parameter } N) \tag{33}$$

The function $f_9$ is determined on the basis of a relation between the control parameter N which was experimentally acquired through a prior simulation experiment or the like, and the correction value $C_9$. In this Embodiment 3, although the number of correction values $C_9$ is one, there can be provided any number of correction values $C_9$ according to the number of control parameters N.

For example, assuming that the correction value $C_9$ is used as a correction coefficient, and the reference value $w_{4\_basic}$ in the equation (13) is multiplied by the correction value, the weighting factor $w_4$ is shown as follows:

$$w_4 = w_{4\_basic} \times C_9$$

Assuming that the appropriate value of the weighting factor $w_4$ is estimated through a prior experiment, the following equation: $C_9 = w_4/w_{4\_basic}$ must be satisfied if $w_4 = w_{4\_basic} \times C_9$.

An appropriate $C_9 = w_4/w_{4\_basic}$ can be estimated from the estimated weighting factor $w_4$ and the reference value $w_{4\_basic}$ which is calculated according to the equation (13).

Assuming that the estimated appropriate $C_9 = w_4/w_{4\_basic}$ (value) shows a change, as shown in FIG. 4 or 5, for the variable (the control parameter N), the function $f_9$ in the equation (33) can be determined according to the same procedure as that for determining the function f in the equation (2) of above-mentioned Embodiment 1.

In order to calculate a final weighting factor $w_4$, the correction value calculating unit 32, where a value for correcting the weighting factor reference value $w_{4\_basic}$ is expressed as $C_{final}$, has to calculate $C_{final}$ on the basis of a function $f_{final\_2}$ indicating a relation between $C_1$ to $C_9$ which are calculated individually according to the equations (21), (23), (25), (27), (28), (29), (31), (32), and (33), and $C_{final}$.

$$C_{final} = f_{final\_2}(C_1, C_2, C_3, C_4, C_5, C_6, C_7, C_8, C_9) \tag{34}$$

The function $f_{final\_2}$ is determined on the basis of a relation between $C_1$ to $C_9$ which were experimentally acquired through a prior simulation experiment or the like, and $C_{final}$.

For example, assuming that the correction value $C_{final}$ is used as a correction coefficient, and the reference value $w_{4\_basic}$ in the equation (13) is multiplied by the correction value, the weighting factor $w_4$ is shown as follows:

$$w_4 = w_{4\_basic} \times C_{final}$$

Assuming that the appropriate value of the weighting factor $w_4$ is estimated through a prior experiment, the following equation: $C_{final} = w_4/w_{4\_basic}$ must be satisfied if $w_4 = w_{4\_basic} \times C_S$.

An appropriate $C_{final}=w_4/w_{4\_basic}$ can be estimated from the estimated weighting factor $w_4$ and the reference value $w_{4\_basic}$ which is calculated according to the equation (13).

Assuming that the estimated appropriate $C_{final}=w_4/w_{4\_basic}$ (value) shows a change, as shown in FIG. 4 or 5, for either element of the variables ($C_1$, $C_2$, $C_3$, $C_4$, $C_5$, $C_6$, $C_7$, $C_8$, and $C_9$), the function $f_{final\_2}$ in the equation (34) can be determined according to the same procedure as that for determining the function f in the equation (2) of above-mentioned Embodiment 1.

The weighting factor $w_4$ is calculated by multiplying the reference value $w_{4\_basic}$ of the weighting factor which is calculated by the reference parameter calculating unit 31 by the correction coefficient $f_{final}$ which is calculated according to the above-mentioned equation (34), as shown in the following equation (35) (step ST23).

$$w_4 = w_{4\_basic} \times C_{final} \quad (35)$$

As the function $f_{final\_2}$ shown by the equation (34), there is, for example, the following equation (36):

$$C_{final} = C_1 \times C_2 \times C_3 \times C_4 \times C_5 \times C_6 \times C_7 \times C_8 \times C_9 \quad (36)$$

In the case of using this equation (36), even if increase in the floor height, the number of floors, or the express zone distance causes the running distance to be twice compared with that according to the building specifications which are defined as the reference environment, and therefore the evaluated value $E_4(i)$ of the running distance of the equation (1) becomes twice, the evaluated value $E_4(i)$ of the running distance is not regarded as important too much because the weighting factor $w_4$ is reduced to the half because of either one of the correction values $C_1$, $C_2$, and $C_3$. The equation (36) is an example of the equation (34).

When the correction value calculating unit 32 calculates the weighting factor $w_4$, the processes of steps ST3 to ST7 are carried out after that. Because the processes of steps ST3 to ST7 are the same as those of above-mentioned Embodiment 1, the explanation of them will be omitted hereafter.

In this Embodiment 3, when calculating the weighting factor $w_4$, the elevator group control apparatus calculates the reference value $w_{4\_basic}$ according to the traffic conditions which vary at any time even after the plurality of elevators are made to start operating, and takes into consideration the influence of the other control parameter N on the basis of the correction value $C_9$ which is calculated by the control parameter correction value calculating unit 32i.

However, as explained in above-mentioned Embodiment 1, the control parameter N includes a parameter which varies after the plurality of elevators are made to start operating, and a parameter which does not vary after the plurality of elevators are made to start operating.

Therefore, the reference parameter calculating unit 31 can use the control parameter N for the calculation of the reference value $w_{4\_basic}$.

For example, when the control parameter N which varies even after the plurality of elevators are made to start operating is expressed as $N_{var}$, by taking into consideration the influence of variations in $N_{var}$, the reference parameter calculating unit 31 calculates the reference value $w_{4\_basic}$ according to the following equation (37):

$$w_{4\_basic} = f_{basic\_2}(P, Q, N_{var}) \quad (37)$$

The reference function $f_{basic\_2}$ is determined on the basis of a relation between the parameters P, Q, and $N_{var}$, which were experimentally acquired through a prior simulation experiment or the like, and the reference value $w_{4\_basic}$.

For example, assuming that, as a result of carrying out a simulation experiment on the conditions of specific elevator specifications, a specific building shape, and a specific control parameter N (in a reference environment), the value (value) of the reference value $w_{4\_basic}$ of the weighting factor which provides the largest amount of reduction of the running distance changes, as shown in FIG. 4 or 5, with change in either element of the variables (P, Q, and $N_{var}$), within the limits of not making the average waiting time become worse, $f_{basic\_2}$ in the equation (37) can be determined according to the same procedure as that for determining the function f in the equation (2) of above-mentioned Embodiment 1.

As an alternative, assuming that, for example, $N_{var}$ is a parameter showing whether or not an operation mode is being carried out, $N_{var}$ can have one of the following two types of values: a value indicating that the operation mode is being carried out (e.g., assuming that it is "1"), and a value indicating that the operation mode is not being carried out (e.g., assuming that it is "0"). $N_{var}$ can thus have one of a few values which can be selected, and its value is known and is limited.

Therefore, the reference parameter calculating unit 31 can prepare reference functions whose number is the equivalent of the number of expected values of $N_{var}$, and can take into consideration the influence of the control parameter N upon the weighting factor $w_4$.

For example, assuming that the number of expected values of $N_{var}$ is n and the n values are 1, . . . , and n, respectively, the traffic condition associated reference value calculating unit 31a of the reference parameter calculating unit 31 calculates the reference value $w_{4\_basic}$ according to the following equation (38):

$$w_{4\_basic} = f_{basic\_1}(P, Q) \quad \text{(where } N_{var} == 1) \quad (38)$$
$$\phantom{w_{4\_basic} =} f_{basic\_2}(P, Q) \quad \text{(where } N_{var} == 2)$$
$$\vdots$$
$$\phantom{w_{4\_basic} =} f_{basic\_n}(P, Q) \quad \text{(where } N_{var} == n)$$

By using the reference value $w_{4\_basic}$ which is calculated according to the above-mentioned equation (37) or (38), and the remaining correction values, the weighting factor $w_4$ can be calculated according to, for example, the equation (35).

A procedure for determining the functions $f_{basic\_1}$ to fbasic_n is the same as that for determining the function $f_{basic}$ in the equation (13).

In general, because although the parameters showing the elevator specifications, such as the rated speed, the acceleration, the elevator capacity, the number of the elevator, the door opening and closing time, the floor height, the number of floors, and the express zone distance, and the building specifications differ for every building to which the plurality of elevators are supplied, they are rarely changed after the plurality of elevators are made to start operating, the parameters can be stored in the elevator group control apparatus in advance through prior work. Although it is assumed that fixed values, such as a maximum, a minimum, and an average, of each of the following parameters: the rated speed, the acceleration, and the door opening and closing time are used, their instantaneous values can be used instead as long as they can be detected by using, for example, sensors.

Furthermore, in a case in which an Nth-power evaluated value of the waiting time and an Nth-power evaluated value of the running distance are used as the evaluated value $E_1(i)$ of the waiting time and the evaluated value $E_4(i)$ of the running distance in the equation (1), the Nth power of each of the correction values $C_1$ to $C_9$ can also be calculated and used in the equation (35).

Even if increase in the floor height, the number of floors, or the express zone distance causes the running distance to be twice and therefore the evaluated value $E_4(i)$ of the running distance of the equation (1) becomes $2^N$ times as much as before under the influence of the Nth-power evaluation, the evaluated value $E_4(i)$ of the running distance is not regarded as important too much because the weighting factor $w_4$ is reduced to $1/(2^N)$ th as much as before because of the Nth power of either one of the correction values $C_1$, $C_2$, and $C_3$.

In the equation (34) and the process of deriving a regression equation for another correction value, the correction value is used as a correction coefficient, and the reference value is multiplied by the correction value, though any one of four operations can be used in order to carry out the correction.

Furthermore, in this Embodiment 3, the weighting factor $w_4$ is calculated by using the traffic, the traffic pattern, the rated speed, the acceleration, the elevator capacity, the number of elevators, the door opening and closing time, the floor height, the express zone distance, the number of floors, and the control parameter N. However, it is necessary to not necessarily use all the elements to calculate the weighting factor $w_4$.

In general, the smaller number of elements are used for the calculation of the weighting factor $w_4$, the lower degree of accuracy the calculated weighting factor $w_4$ has compared with an optimum value of the weighting factor $w_4$.

For example, if the floor height is not included in the elements used for the calculation of the weighting factor $w_4$, there is a high possibility that the calculated weighting factor $w_4$ does not have an appropriate value when the floor height varies.

In this Embodiment 3, the arithmetic operation of calculating the weighting factor $w_4$ is explained as an example. The control parameter calculated is not limited only to the weighting factor $w_4$. For example, another weighting factor, such as $w_1$, $w_2$, or $w_3$, can be calculated.

The weighting factor $w_4$ relatively shows what degree of importance should be placed on the evaluated value $E_4(i)$ of the running distance shown in the equation (1) compared with the other evaluated values $E_1(i)$, $E_2(i)$, and $E_3(i)$, when determining an elevator to which the hall call is to be assigned.

By changing, for example, the weighting factor $w_1$, $w_2$, or $w_3$ dynamically, instead of making the weighting factor $w_4$ have a fixed value, the operations of the plurality of elevators can be controlled in such a way that their running distances can be reduced without making the waiting time become worse much. This changing operation is equivalent to dynamically changing of the weighting factor $w_4$.

As can be seen from the above description, the elevator group control apparatus in accordance with this embodiment 3 is so constructed as to derive the reference value $w_{4\_basic}$ of the weighting factor $w_4$ for the item to be evaluated of the running distance from the parameters showing the traffic conditions, and correct the reference value $w_4$ of the weighting factor $w_4$ according to the parameters showing the elevator specifications, the building specifications, and the elevator control state. Therefore, this embodiment offers an advantage of being able to acquire an appropriate weighting factor according to variations in the traffic conditions.

More specifically, by fixing elements other than the specific elements (the parameters) so as to determine a reference environment, and calculating the reference value of the control parameter 1 by using a reference function which changes only elements which are not fixed in the reference environment, the reference function is simplified. Furthermore, by calculating separately a correction value for compensating the difference between the reference value of the control parameter 1 and an appropriate value of the control parameter 1 which is caused by the difference between the value of each element in the reference environment and the actual value of each element, the method for deriving the control parameter 1 is made to become simplified as a whole. Therefore, the present embodiment offers an advantage of making it easy to presume a state in which the control parameter 1 to be derived deviates from an expected value, and, if the control parameter 1 deviates from the expected value, to diagnose the cause of this deviation.

In this Embodiment 3, the reference parameter calculating unit 31 calculates the reference value $w_{4\_basic}$ of the weighting factor, and the correction value calculating unit 32 calculates the correction values $C_1$ to $C_9$ for correcting the reference value $w_{4\_basic}$, as previously mentioned. As an alternative, instead of the calculation parameters 21 explained in above-mentioned Embodiment 2, the reference parameter calculating unit 31 can calculate the reference value of the control parameter X, and the correction value calculating unit 32 can calculate a correction value for correcting the reference value of the control parameter X so as to correct the reference value of the control parameter X according to variations in the parameters.

As also explained in above-mentioned Embodiment 2, because the control parameter X is calculated by using the same calculating method as that with which the weighting factor $w_4$ is calculated, the reference value and correction value of the control parameter X can also be calculated by using the same calculating method as that with which the reference value $w_{4\_basic}$ of the weighting factor and the correction values $C_1$ to $C_9$ are calculated.

INDUSTRIAL APPLICABILITY

As mentioned above, the elevator group control apparatus in accordance with the present invention is so constructed as to take into consideration the relation between the running distance of each of a plurality of elevators and the passenger waiting time, and select the best elevator from the plurality of elevators on the basis of the total evaluated value of each of the plurality of elevators which is calculated from the item to be evaluated of the passenger waiting time of each of the plurality of elevators, the item to be evaluated of the running distance of each of the plurality of elevators, and the weighting factor for the item to be evaluated which is calculated from the estimated running distance of each of the plurality of elevators to assign a hall call to the selected elevator. Therefore, because the elevator group control apparatus can reduce the running distance of each of the plurality of elevators without causing occurrence of an inconvenient status, such as an increase in the passenger waiting time, thereby enhancing the energy conservation effect, the elevator group control apparatus is suitable for use in a building in which a plurality of elevators are installed.

The invention claimed is:

1. An elevator group control apparatus comprising:
an estimation arithmetic operation means for, in a case in which a plurality of elevators are employed and a hall call has occurred, when assigning said hall call to each of said plurality of elevators, estimating a running time required for each of said plurality of elevators to run from its current position to a floor at which the hall call has occurred in response to said hall call, and also estimating a running distance over which each of said plurality of elevators runs from its current position to the floor at which the hall call has occurred in response to said hall call;

a weighting factor determining means for determining a weighting factor for an item to be evaluated, which is calculated from the running distance estimated by said estimation arithmetic operation means by taking into consideration a relation between a running distance of an elevator and a passenger waiting time;

a total evaluated value calculating means for calculating a total evaluated value of each of said plurality of elevators from the item to be evaluated of said running distance, an item to be evaluated of said running time, and the weighting factor determined by said weighting factor determining means; and a hall call assignment means for selecting an elevator whose total evaluated value that is calculated by said total evaluated value calculating means is best from among said plurality of elevators, and for assigning said hall call to said selected elevator.

2. The elevator group control apparatus according to claim 1, wherein the weighting factor determining means determines the weighting factor for the item to be evaluated, which is calculated from the running distance estimated by the estimation arithmetic operation means by using at least one of parameters showing traffic conditions, elevator specifications, building specifications, and an elevator control state.

3. The elevator group control apparatus according to claim 2, wherein when the item to be evaluated which is calculated from the running distance estimated by the estimation arithmetic operation means monotonously increases with respect to the running distance, the weighting factor determining means determines the weighting factor such that the weighting factor monotonously decreases with respect to the running distance, whereas when the item to be evaluated which is calculated from the running distance estimated by the estimation arithmetic operation means monotonously decreases with respect to the running distance, the weighting factor determining means determines the weighting factor in such a way that the weighting factor monotonously increases with respect to the running distance.

4. The elevator group control apparatus according to claim 2, wherein the weighting factor determining means derives a reference value of the weighting factor for the item to be evaluated of the running distance from the parameter showing the traffic conditions, and corrects the reference value of said weighting factor according to the parameters showing the elevator specifications, the building specifications, and the elevator control state.

5. The elevator group control apparatus according to claim 4, wherein when the item to be evaluated which is calculated from the running distance estimated by the estimation arithmetic operation means monotonously increases with respect to the running distance, the weighting factor determining means corrects the weighting factor such that the weighting factor monotonously decreases with respect to the running distance, whereas when the item to be evaluated which is calculated from the running distance estimated by the estimation arithmetic operation means monotonously decreases with respect to the running distance, the weighting factor determining means corrects the weighting factor such that the weighting factor monotonously increases with respect to the running distance.

6. The elevator group control apparatus according to claim 2, wherein the weighting factor determining means calculates the parameter indicating the traffic conditions from both a volume of traffic from a main floor and floors below the main floor to floors above the main floor and a volume of traffic from the floors above the main floor to the main floor and the floors below the main floor.

7. An elevator group control apparatus comprising:

an estimation arithmetic operation means for, in a case in which a plurality of elevators are employed and a hall call has occurred, estimating a running time required for each of said plurality of elevators to run from its current position to a floor on which the hall call has occurred in response to said hall call when assigning said hall call to each of the plurality of elevators;

a degree-of-conformance calculating means for calculating a degree of rule conformance for a selection rule for selecting a candidate elevator to which said hall call can be assigned by taking into consideration a relation between a running distance of an elevator and a passenger waiting time;

a candidate elevator selecting means for selecting, as a candidate elevator, an elevator whose degree of rule conformance calculated by said degree-of-conformance calculating means satisfies the selection rule from among the plurality of elevators;

a total evaluated value calculating means for calculating a total evaluated value of said candidate elevator, said total evaluated value having, as an item to be evaluated, the running time estimated by said estimation arithmetic operation means; and a hall call assignment means for selecting an elevator whose total evaluated value calculated by said total evaluated value calculating means is best from among candidate elevators selected by said candidate elevator selecting means, and for assigning said hall call to said selected elevator.

8. The elevator group control apparatus according to claim 7, wherein the degree-of-conformance calculating means calculates the degree of rule conformance for the selection rule for selecting a candidate elevator to which the hall call can be assigned by using at least one of parameters showing traffic conditions, elevator specifications, building specifications, and an elevator control state.

9. The elevator group control apparatus according to claim 8, wherein the degree-of-conformance calculating means derives a reference value of the degree of rule conformance for the selection rule for selecting a candidate elevator from the parameter showing the traffic conditions, and corrects the reference value of said degree of rule conformance according to the parameters showing the elevator specifications, the building specifications, and the elevator control state.

10. The elevator group control apparatus according to claim 8, wherein the degree-of conformance calculating means calculates the parameter indicating the traffic conditions from both a volume of traffic from a main floor and floors below the main floor to floors above the main floor and a volume of traffic from the floors above the main floor to the main floor and the floors below the main floor.

* * * * *